(12) United States Patent
Wen et al.

(10) Patent No.: US 11,546,800 B2
(45) Date of Patent: Jan. 3, 2023

(54) DATA PROCESSING METHOD AND TERMINAL

(71) Applicant: HUAWEI TECHNOLOGIES CO., LTD., Guangdong (CN)

(72) Inventors: Yanping Wen, Shenzhen (CN); Pei Huang, Wuhan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 56 days.

(21) Appl. No.: 16/980,571

(22) PCT Filed: Mar. 26, 2018

(86) PCT No.: PCT/CN2018/080509
§ 371 (c)(1),
(2) Date: Sep. 14, 2020

(87) PCT Pub. No.: WO2019/183760
PCT Pub. Date: Oct. 3, 2019

(65) Prior Publication Data
US 2021/0007010 A1 Jan. 7, 2021

(51) Int. Cl.
*H04B 1/00* (2006.01)
*H04L 1/18* (2006.01)
(Continued)

(52) U.S. Cl.
CPC ....... *H04W 28/08* (2013.01); *H04W 28/0289* (2013.01); *H04W 72/0413* (2013.01);
(Continued)

(58) Field of Classification Search
None
See application file for complete search history.

(56) References Cited

U.S. PATENT DOCUMENTS

| | | | | |
|---|---|---|---|---|
| 2006/0142032 | A1* | 6/2006 | Derakhshan | H04W 36/30 455/509 |
| 2011/0261754 | A1* | 10/2011 | Trainin | H04L 5/001 370/328 |

(Continued)

FOREIGN PATENT DOCUMENTS

| | | |
|---|---|---|
| CN | 102469591 A | 5/2012 |
| CN | 102684822 A | 9/2012 |

(Continued)

OTHER PUBLICATIONS

International Search Report dated Dec. 29, 2018, issued in counterpart Application No. PCT/CN2018/080509, with English Translation. (12 pages).

(Continued)

*Primary Examiner* — Sithu Ko
(74) *Attorney, Agent, or Firm* — WHDA, LLP

(57) ABSTRACT

The present disclosure relates to a data processing method. The method includes: separately establishing, by a terminal, communication connections to a first frequency band network of a router and a second frequency band network of the router; transmitting, by the terminal, data by using the first frequency band network and the second frequency band network, where the data includes uplink data and downlink data; determining, by the terminal based on a transmission status of the first frequency band network and a transmission status of the second frequency band network, to transmit the downlink data by using the second frequency band network and transmit the uplink data by using the first frequency band network; and transmitting, by the terminal, the downlink data by using the second frequency band network, and transmitting the uplink data by using the first frequency band network.

17 Claims, 12 Drawing Sheets

(51) Int. Cl.
    *H04W 28/08*           (2009.01)
    *H04W 76/15*           (2018.01)
    *H04W 28/02*           (2009.01)
    *H04W 72/04*           (2009.01)
    *H04W 72/10*           (2009.01)
    *H04W 84/12*           (2009.01)
    *H04W 88/06*           (2009.01)

(52) U.S. Cl.
    CPC ........... *H04W 72/10* (2013.01); *H04W 76/15* (2018.02); *H04W 72/0453* (2013.01); *H04W 84/12* (2013.01); *H04W 88/06* (2013.01)

(56) References Cited

U.S. PATENT DOCUMENTS

| | | | | |
|---|---|---|---|---|
| 2013/0242887 | A1* | 9/2013 | Zhu | H04L 67/02 |
| | | | | 370/329 |
| 2014/0220960 | A1 | 8/2014 | Nagel et al. | |
| 2015/0138981 | A1* | 5/2015 | Nuss | H04W 72/0486 |
| | | | | 370/235 |
| 2015/0271829 | A1* | 9/2015 | Amini | H04W 24/02 |
| | | | | 370/329 |
| 2016/0029384 | A1* | 1/2016 | Sidhu | H04W 72/0453 |
| | | | | 370/329 |
| 2016/0044711 | A1* | 2/2016 | Lou | H04B 7/0617 |
| | | | | 370/338 |
| 2016/0192381 | A1* | 6/2016 | Gao | H04W 84/12 |
| | | | | 370/330 |
| 2017/0055193 | A1* | 2/2017 | Mueck | H04W 16/14 |
| 2017/0085278 | A1* | 3/2017 | Emmanuel | H04L 69/16 |
| 2017/0251374 | A1* | 8/2017 | Leinonen | H04L 5/001 |
| 2018/0184346 | A1* | 6/2018 | Wang | H04W 76/10 |
| 2018/0199228 | A1* | 7/2018 | Van Phan | H04W 72/1242 |
| 2019/0098566 | A1* | 3/2019 | Li | H04W 88/06 |

FOREIGN PATENT DOCUMENTS

| | | | |
|---|---|---|---|
| CN | 102684823 | A | 9/2012 |
| CN | 103490870 | A | 1/2014 |
| CN | 104469958 | A | 3/2015 |
| CN | 106533495 | A * | 9/2015 |
| CN | 105101308 | A | 11/2015 |
| CN | 106533495 | A | 3/2017 |
| EP | 1083625 | A2 | 3/2001 |

OTHER PUBLICATIONS

Office Action dated May 8, 2021, issued in counterpart CN Application No. 201880091825.5, with English Translation. (13 pages).

* cited by examiner

User    Terminal

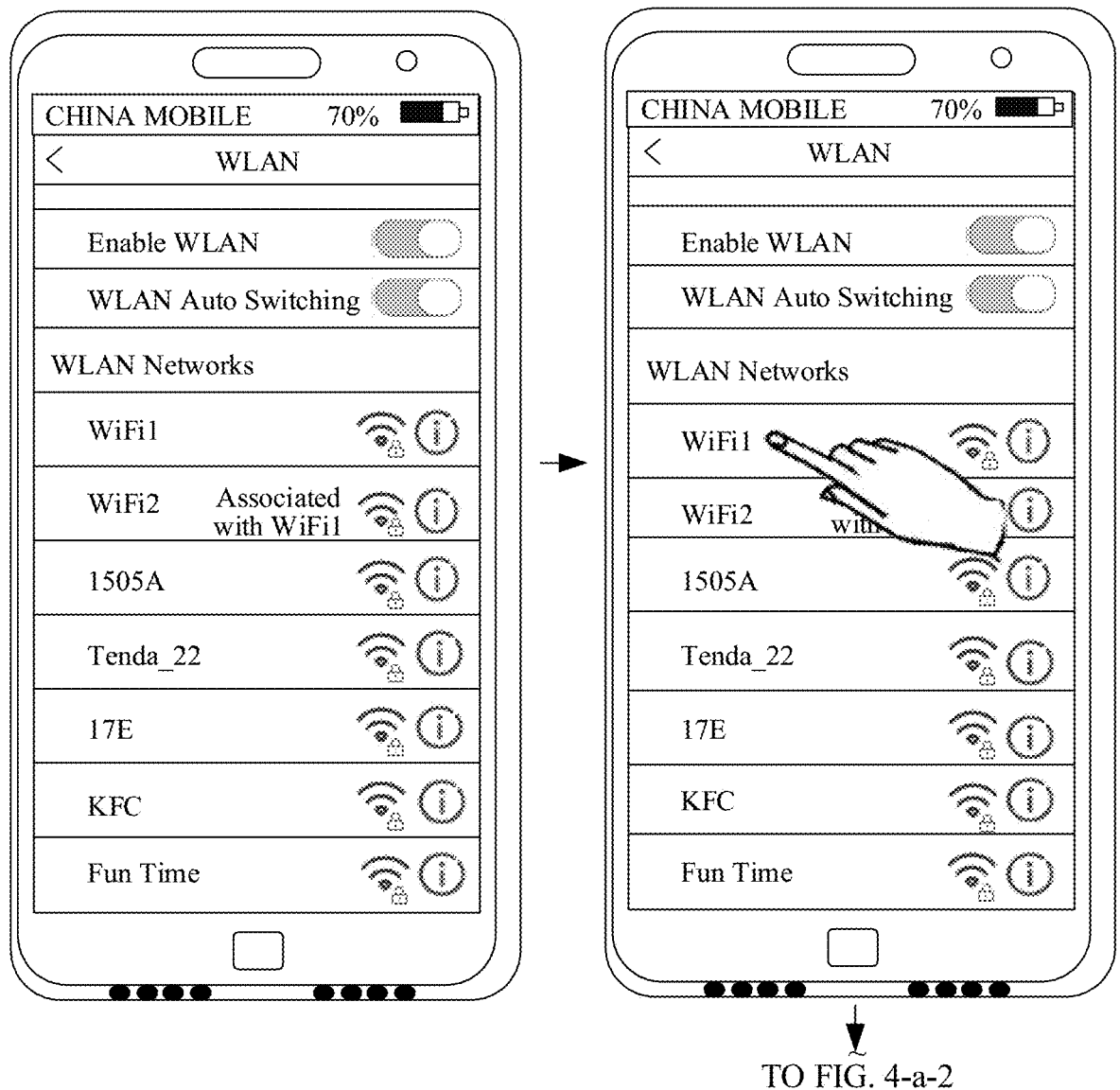
FIG. 4-a-1

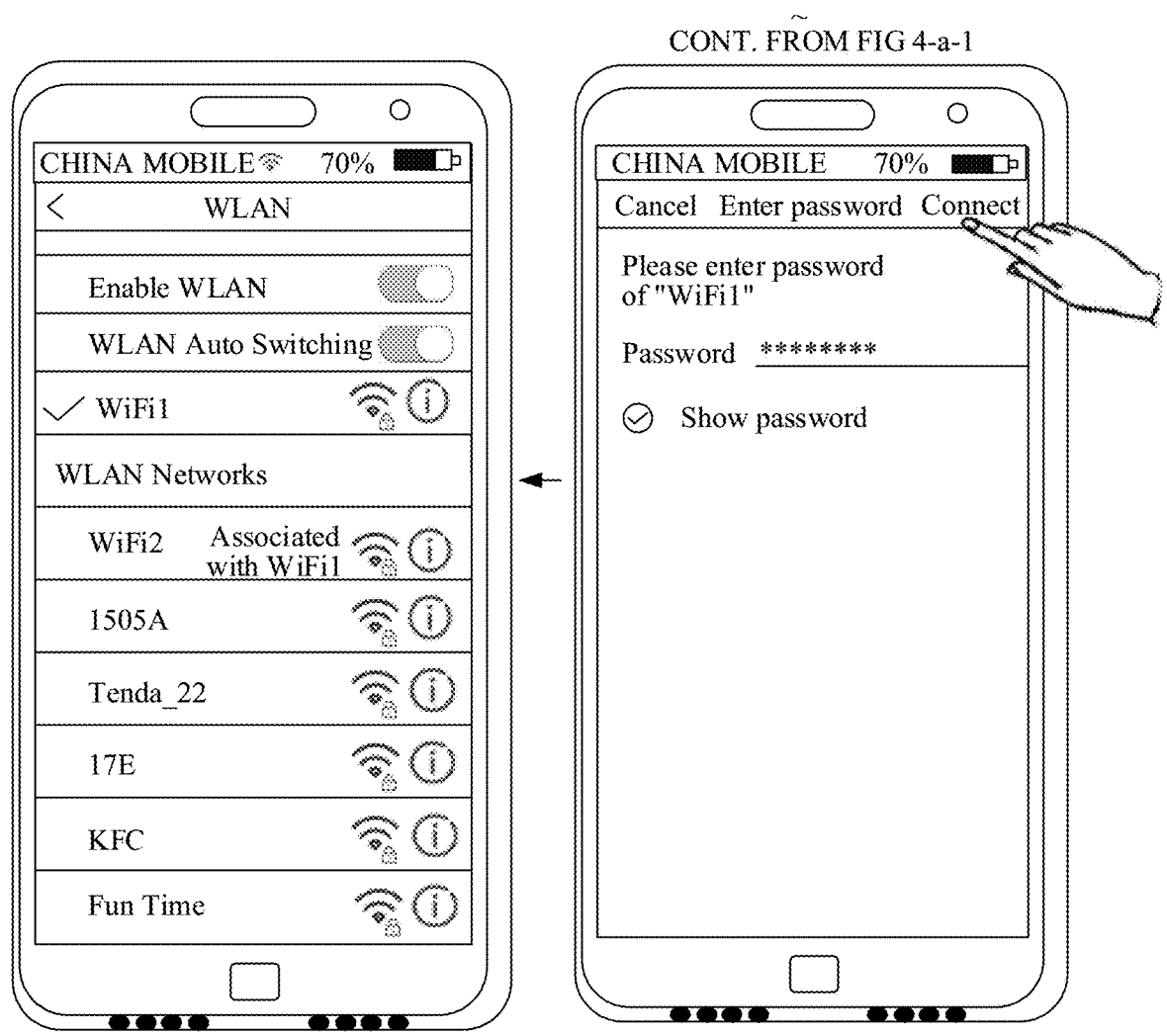
FIG. 4-a-2

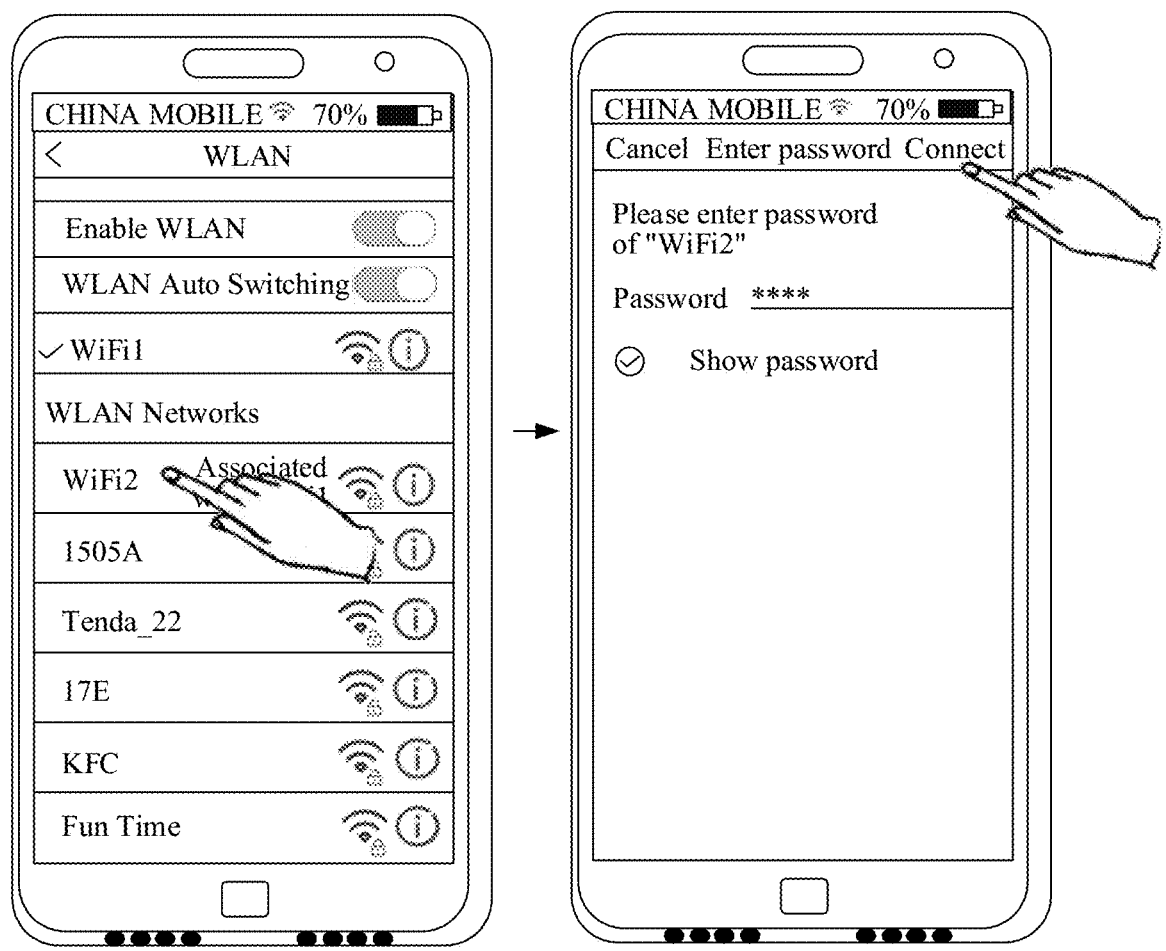
TO FIG. 4-b-2
FIG. 4-b-1

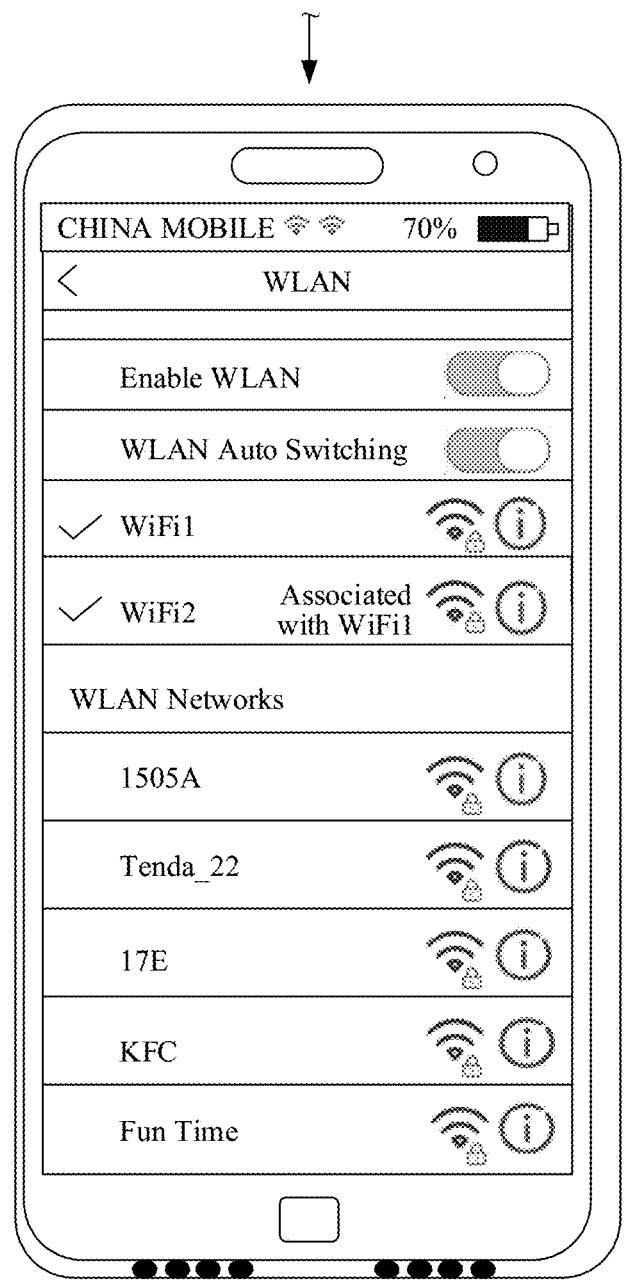
FIG. 4-b-2

DATA PROCESSING METHOD AND TERMINAL

CROSS-REFERENCE TO RELATED APPLICATIONS

This application is a National Stage of International Patent Application No. PCT/CN2018/080509 filed on Mar. 26, 2018, which is incorporated herein by reference in its entirety.

TECHNICAL FIELD

This application relates to the field of communications technologies, and in particular, to a data processing method and a terminal.

BACKGROUND

As wireless communications technologies develop, a wireless communications device has more functions, and a multi-band wireless communications device is more common, for example, a multi-band router or a terminal having a dual-band support function.

Currently, when a terminal that supports a dual-band function uses dual-band communication, the terminal is connected to a frequency band network in a multi-band router to obtain data. When the terminal determines that a signal of another frequency band network of the router is stronger, the terminal switches wireless network communication to the another frequency band network, and then, data is transmitted by using the frequency band network.

However, if the terminal uses one frequency band network to obtain data, user experience is relatively poor. For example, when a terminal uses the frequency band network to download big data, if a service load amount of the frequency band network is excessively large, and in this case, if the terminal simultaneously performs a video service and/or an audio service, frame freezing may occur, and consequently, cause relatively low smoothness of the audio and video services, thereby affecting user experience.

SUMMARY

Embodiments of this application provide a data processing method and a terminal, to reduce occurrence of a service stalling problem caused by packet congestion, thereby improving user experience.

A first aspect of the embodiments of this application provides a data processing method, including:

In a wireless communications network, when a user needs to transmit data by using the wireless communications network, the user needs to connect a terminal to a wireless network to implement data transmission. If the user enables a wireless network connection function of the terminal, the terminal may detect a frequency band network of a router. When detecting a first frequency band network of the router and a second frequency band network of the router, the terminal may separately establish communication connections to the first frequency band network and the second frequency band network at the same time, and after the terminal connects to the first frequency band network and the second frequency band network, the terminal may simultaneously transmit uplink data and downlink data by using the first frequency band network and the second frequency band network. Then, the terminal may determine, based on a transmission status of the first frequency band network and a transmission status of the second frequency band network, to transmit the downlink data by using the second frequency band network and transmit the uplink data by using the first frequency band network. After the terminal determines a transmission policy, the terminal may transmit the downlink data by using the second frequency band network and transmit the uplink data by using the first frequency band network.

In this embodiment of this application, the terminal may determine, based on the transmission status of the first frequency band network and transmission of the second frequency band network, to transmit the downlink data by using the second frequency band network and transmit the uplink data by using the first frequency band network, and then the terminal transmits the downlink data by using the second frequency band network and transmits the uplink data by using the first frequency band network. Therefore, the terminal may simultaneously transmit data by using dual-band networks. Compared with that the terminal transmits data by using only one frequency band network, the terminal may have larger capacity for data transmission. In addition, uplink data and downlink data are transmitted by using an inter-frequency channel to reduce the occurrence of a service stalling problem caused by congestion of a control packet in the uplink data, and to improve service smoothness, thereby improving user experience.

In a possible implementation, the determining, by the terminal based on a transmission status of the first frequency band network and a transmission status of the second frequency band network, to transmit the downlink data by using the second frequency band network and transmit the uplink data by using the first frequency band network includes: the terminal may determine, based on a service load amount of the first frequency band network and a service load amount of the second frequency band network, to transmit the downlink data by using the second frequency band network and transmit the uplink data by using the first frequency band network.

In the possible implementation, the terminal may determine, based on the service load amount of the first frequency band network and the service load amount of the second frequency band network, to transmit the downlink data by using the second frequency band network and transmit the uplink data by using the first frequency band network. That is, the transmission status of the first frequency band network and the transmission status of the second frequency band network may be the service load amount of the first frequency band network and the service load amount of the second frequency band network. Therefore, a specific determining manner in which the terminal determines to transmit the downlink data by using the second frequency band network and transmit the uplink data by using the first frequency band network is provided. In actual application, feasibility of the solution is improved.

In another possible implementation, the downlink data may include data of a data service. The uplink data may include uplink control data. The transmission status of the first frequency band network and the transmission status of the second frequency band network may include: a service load amount of the first frequency band network is greater than a first preset threshold. The determining, by the terminal based on a transmission status of the first frequency band network and a transmission status of the second frequency band network, to transmit the downlink data by using the second frequency band network and transmit the uplink control data by using the first frequency band network may include: the terminal may determine to transmit the data of the data service by using the second frequency band network; and the terminal may determine to transmit the uplink control data by using the first frequency band network.

In the possible implementation, the downlink data includes the data of the data service, and the uplink data includes the uplink control data. When the service load amount of the first frequency band network is greater than the first preset threshold, the terminal may determine to transmit the uplink control data by using the first frequency band network and determine to transmit the data of the data service by using the second frequency band network. Therefore, a specific determining condition under which the terminal determines to transmit the uplink control data by using the first frequency band network and determines to transmit the data of the data service by using the second frequency band network is provided. In actual application, feasibility of the solution is improved.

In another possible implementation, the downlink data may include data of a data service. The uplink data may include uplink control data. The transmission status of the first frequency band network and the transmission status of the second frequency band network may include that a service load amount of the first frequency band network is greater than a first preset threshold and a service load amount of the second frequency band network is greater than a second preset threshold. The determining, by the terminal based on a transmission status of the first frequency band network and a transmission status of the second frequency band network, to transmit the downlink data by using the second frequency band network and transmit the uplink control data by using the first frequency band network may include: the terminal may determine to transmit the data of the data service by using the second frequency band network; and the terminal may determine to transmit the uplink control data by using the first frequency band network.

In the possible implementation, the downlink data includes the data of the data service, and the uplink data includes the uplink control data. When the service load amount of the first frequency band network is greater than the first preset threshold and the service load amount of the second frequency band network is greater than the second preset threshold, the terminal may determine to transmit the uplink control data by using the first frequency band network and determine to transmit the data of the data service by using the second frequency band network. Therefore, a specific determining condition under which the terminal determines to transmit the uplink control data by using the first frequency band network and determines to transmit the data of the data service by using the second frequency band network is provided. In actual application, feasibility of the solution is improved.

In another possible implementation, that the terminal may transmit the downlink data by using the second frequency band network and transmit the uplink data by using the first frequency band network may include: the terminal may transmit data of the data service by using the second frequency band network, and the terminal may preferentially transmit the uplink control data by using the first frequency band network.

In the possible implementation, the terminal transmits the data of the data service by using the second frequency band network and preferentially transmits the uplink control data by using the first frequency band network. Therefore, the terminal may transmit the data of the data service and the uplink control data by using an inter-frequency channel, and preferentially transmit the uplink control data in the first frequency band network. Therefore, in a traffic intensive usage scenario, a phenomenon of a service stalling problem caused by control packet congestion when a network load is relatively heavy can be reduced, thereby improving service smoothness and user experience.

In another possible implementation, the preferentially transmitting, by the terminal, the uplink control data by using the first frequency band network may include: First, the terminal may mark a label on a packet corresponding to the uplink control data, and then the terminal may preferentially transmit the uplink control data based on the label by using the first frequency band network.

In the possible implementation, the terminal marks a label on a packet corresponding to the uplink control data, and then the terminal preferentially transmits the uplink control data based on the label by using the first frequency band network. A specific method in which the terminal preferentially transmits the uplink control data in the first frequency band network is provided. In actual application, feasibility of the solution is improved.

In another possible implementation, the preferentially transmitting, by the terminal, the uplink control data by using the first frequency band network may include: First, the terminal sets the uplink control data in a high-priority queue of the first frequency band network; and then the terminal preferentially transmits the uplink control data in the high-priority queue by using the first frequency band network.

In the possible implementation, the terminal sets the uplink control data in a high-priority queue of the first frequency band network, and then the terminal preferentially transmits the uplink control data in the high-priority queue. Another specific method in which the terminal preferentially transmits the uplink control data in the first frequency band network is provided. In actual application, feasibility and integrity of the solution are improved.

In another possible implementation, before the determining, by the terminal, to transmit the data of the data service by using the second frequency band network, the method may further include: the terminal may determine data corresponding to the data service in the downlink data.

In the possible implementation, the terminal may determine the data corresponding to the data service in the downlink data. In actual application, integrity of the solution is improved.

In another possible implementation, the determining, by the terminal, data corresponding to a data service in the downlink data may include: the terminal may determine, based on a port number of a packet of the downlink data, the data corresponding to the data service in the downlink data; or the terminal may determine, based on a data frame in a packet of the downlink data, the data corresponding to the data service in the downlink data.

In the possible implementation, the terminal determines, based on the port number of the packet of the downlink data, the data corresponding to the data service in the downlink data, or the terminal determines, based on the data frame in the packet of the downlink data, the data corresponding to the data service in the downlink data. A specific method in which the terminal determines the data corresponding to the data service in downlink data is provided. In actual application, feasibility and completeness of the solution are improved.

In another possible implementation, the first frequency band network may be a 2.4 GHz frequency band network, and the second frequency band network may be a 5 GHz frequency band network.

In the possible implementation, the first frequency band network may be a 2.4 GHz frequency band network, and the second frequency band network may be a 5 GHz frequency band network. In actual application, an actual application scenario is provided, thereby improving feasibility of the solution.

A second aspect of the embodiments of this application provides a data processing method, including:

In a wireless communications network, when a user needs to transmit data by using the wireless communications network, the user needs to connect a terminal to a wireless network to implement data transmission. If the user enables a wireless network connection function of the terminal, the terminal may detect a frequency band network of a router. When detecting a first frequency band network of the router and a second frequency band network of the router, the terminal may separately establish communication connections to the first frequency band network and the second frequency band network at the same time, and after the terminal connects to the first frequency band network and the second frequency band network, the terminal may simultaneously transmit uplink data and downlink data by using the first frequency band network and the second frequency band network. Then, the terminal may determine, based on a signal strength of the first frequency band network and a signal strength of the second frequency band network, to correspondingly transmit the downlink data and the uplink data by using the first frequency band network and the second frequency band network, and then the terminal transmits the corresponding data by using the corresponding frequency band network.

In this embodiment of this application, the terminal may determine, based on the signal strength of the first frequency band network and the signal strength of the second frequency band network, to correspondingly transmit the downlink data and the uplink data by using the first frequency band network and the second frequency band network. Therefore, the terminal may simultaneously transmit data by using dual-band networks. Compared with that the terminal transmits data by using only one frequency band network, the terminal may have larger space for data transmission. In addition, the terminal may determine, based on the signal strength of the first frequency band network and the signal strength of the second frequency band network, to correspondingly transmit the downlink data and the uplink data by using the first frequency band network and the second frequency band network, so that the terminal may transmit the corresponding data by using the corresponding frequency band network. The corresponding frequency band network is adjusted based on an actual network situation to transmit corresponding data, to reduce a service stalling problem caused by that a packet may not be transmitted in time due to a weak signal strength of the frequency band network to some extent, thereby improving user experience.

In a possible implementation, the uplink data may include uplink control data; the signal strength of the first frequency band network and the signal strength of the second frequency band network may include: the signal strength of the second frequency band network is less than a third preset threshold. The determining, by the terminal based on the signal strength of the first frequency band network and the signal strength of the second frequency band network, to correspondingly transmit the downlink data and the uplink data by using the first frequency band network and the second frequency band network may include: the terminal may determine to transmit the downlink data by using the first frequency band network; and the terminal may determine to transmit the uplink control data by using the second frequency band network.

In the possible implementation, when the signal strength of the second frequency band network is less than the third preset threshold, the terminal may determine to transmit the downlink data by using the first frequency band network and determine to transmit the uplink control data by using the second frequency band network. Therefore, a trigger condition under which a terminal determines to use a corresponding frequency band network to transmit corresponding data is provided. In actual application, when the first frequency band network is a 2.4 GHz frequency band network, and the second frequency band network is a 5 GHz frequency band network, and when the signal strength of the second frequency band network is relatively weak, the terminal transmits the downlink data by using the first frequency band network, and transmits the uplink control data by using the second frequency band network. This may reduce, to some extent, a service stalling problem caused by a distance-sensitive problem of the 5 GHz frequency band network, thereby improving user experience of using the 5 GHz frequency band network.

In a possible implementation, the uplink data may include uplink control data; the signal strength of the first frequency band network and the signal strength of the second frequency band network may include: the signal strength of the second frequency band network is greater than a third preset threshold, and the signal strength of the second frequency band network is greater than a fourth preset threshold. The determining, by the terminal based on the signal strength of the first frequency band network and the signal strength of the second frequency band network, to correspondingly transmit the downlink data and the uplink data by using the first frequency band network and the second frequency band network may include: the terminal may determine to transmit the downlink data by using the second frequency band network; and the terminal may determine to transmit the uplink control data by using the first frequency band network.

In the possible implementation, when the signal strength of the second frequency band network is greater than the third preset threshold and the signal strength of the first frequency band network is greater than the fourth preset threshold, the terminal may transmit the uplink control data by using the first frequency band network, and transmit the downlink data by using the second frequency band network. Therefore, a trigger condition under which a terminal determines to use a corresponding frequency band network to transmit corresponding data is provided. In an actual application, when the first frequency band network is a 2.4 GHz frequency band network, and the second frequency band network is a 5 GHz frequency band network, when the signal strength of the first frequency band network is relatively strong, and when the second frequency band network is restored to normal, the terminal may place the downlink data in the second frequency band network for transmission, and set the uplink control data in the first frequency band network for transmission. In this way, a data transmission network is correspondingly adjusted based on the signal strength of the frequency band network, thereby improving, to some extent, user experience on dual-band networks.

A third aspect of the embodiments of this application provides a terminal. The terminal has a function of implementing behaviors of the terminal according to the first aspect. The function may be implemented by hardware, or may be implemented by hardware by executing corresponding software. The hardware or the software includes one or more modules corresponding to the foregoing function.

A fourth aspect of the embodiments of this application provides a terminal. The terminal has a function of implementing behaviors of the terminal according to the second aspect. The function may be implemented by hardware, or may be implemented by hardware by executing corresponding software. The hardware or the software includes one or more modules corresponding to the foregoing function.

A fifth aspect of the embodiments of this application provides a terminal. The terminal includes a processor, a memory, an input/output device, and a bus. The processor, the memory, and the input/output device are separately connected to the bus, and the memory stores a computer instruction; when the processor executes the computer instruction in the memory, the memory stores the computer instruction; and when executing the computer instruction in the memory, the processor is configured to implement any implementation of the first aspect.

A sixth aspect of the embodiments of this application provides a terminal. The terminal includes a processor, a memory, an input/output device, and a bus; the processor, the memory, and the input/output device are separately connected to the bus, and the memory stores a computer instruction; when the processor executes the computer instruction in the memory, the memory stores the computer instruction; and when executing the computer instruction in the memory, the processor is configured to implement any implementation of the second aspect.

A seventh aspect of the embodiments of this application provides a chip system. The chip system includes a processor, configured to support a network device in implementing a function related to the first aspect, for example, sending or processing data and/or information related to the foregoing method. In a possible design, the chip system further includes a memory, and the memory is configured to store a program instruction and data that are necessary for the network device. The chip system may include a chip, or may include a chip and another discrete device.

An eighth aspect of the embodiments of this application provides a chip system. The chip system includes a processor, configured to support a network device in implementing a function related to the second aspect, for example, sending or processing data and/or information related to the foregoing method. In a possible design, the chip system further includes a memory, and the memory is configured to store a program instruction and data that are necessary for the network device. The chip system may include a chip, or may include a chip and another discrete device.

A ninth aspect of the embodiments of this application provides a computer program product including an instruction, where when the instruction is run on a computer, the computer is enabled to perform any implementation according to the first aspect or the second aspect.

A tenth aspect of the embodiments of this application provides a computer-readable storage medium including an instruction, where when the instruction is run on a computer, the computer is enabled to perform any implementation according to the first aspect or the second aspect.

BRIEF DESCRIPTION OF DRAWINGS

FIG. 4-$a$-1 and FIG. 4-$a$-2 are schematic diagrams of another scenario of a data processing method according to an embodiment of this application;

FIG. 4-$b$-1 and FIG. 4-$b$-2 are schematic diagrams of another scenario of a data processing method according to an embodiment of this application;

FIG. 6-1 and FIG. 6-2 are schematic diagrams of another scenario of a data processing method according to an embodiment of this application;

DESCRIPTION OF EMBODIMENTS

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person skilled in the art based on the embodiments of the present invention shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments of the present invention described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Embodiments of this application provide a data processing method and a terminal, so that the terminal determines, based on a transmission status of a first frequency band network and a transmission status of a second frequency band network, to transmit the downlink data by using the second frequency band network and transmit the uplink data by using the first frequency band network, to reduce occurrence of a service stalling problem caused by packet congestion, thereby improving user experience.

Figure 1:
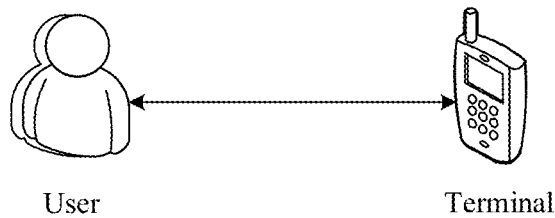
FIG. 1 is a schematic framework diagram of a data processing system according to an embodiment of this application.

Referring to FIG. 1, a terminal and a user need to participate in a data processing process. The terminal is configured to perform communication connections to a frequency band network of a router, and is configured to process data transmitted by the terminal by using the frequency band network of the router.

It should be noted that the terminal may be a mobile phone, a tablet, a tablet computer, or the like. This is not specifically limited herein.

Figure 2:
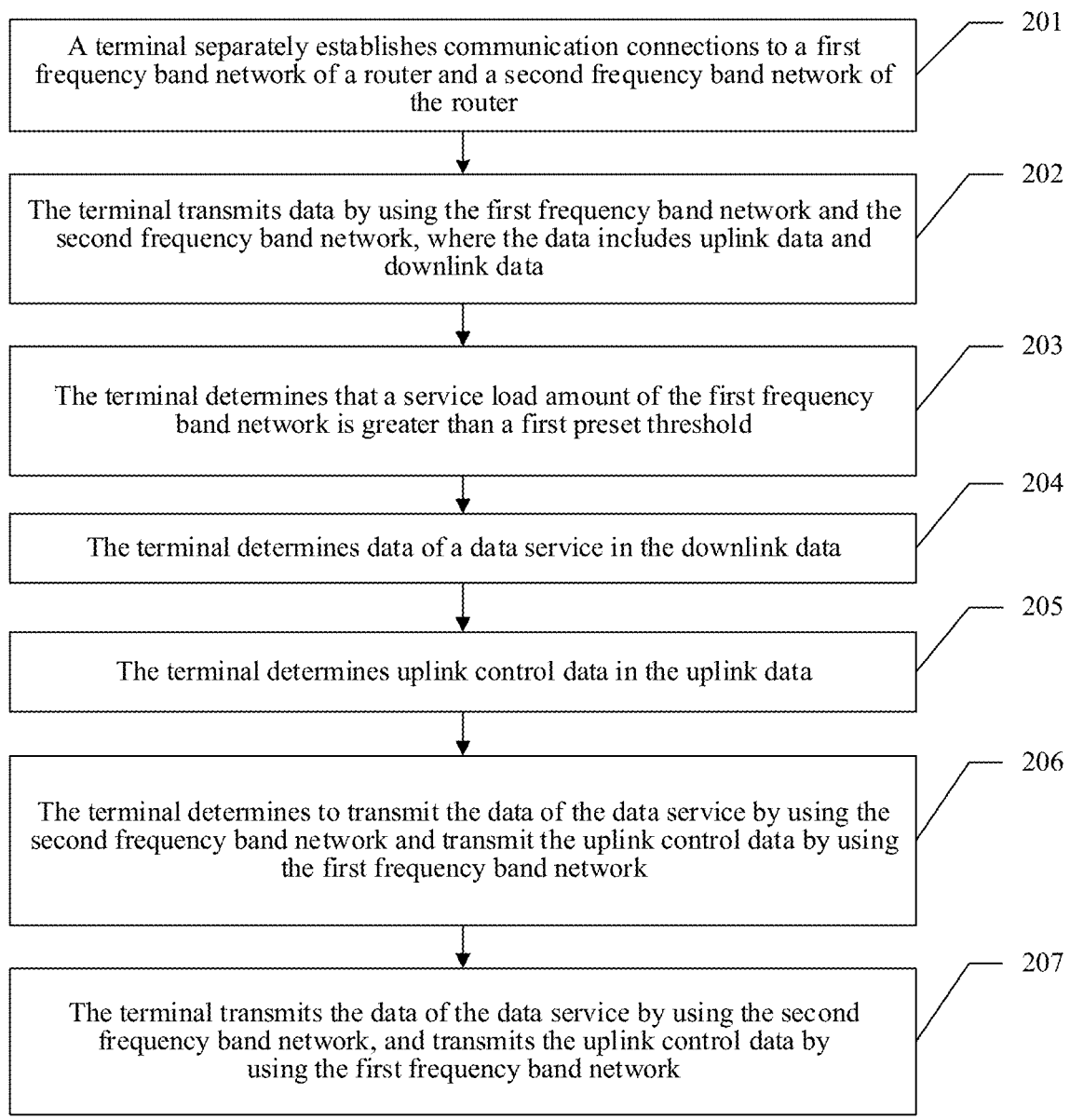
FIG. 2 is a schematic diagram of an embodiment of a data processing method according to embodiments of this application.

The following describes the data processing method in the embodiments of this application from a perspective of a terminal. When the terminal determines that a service load amount of a first frequency band network is greater than a first preset threshold, the terminal determines to transmit uplink control data in uplink data by using the first frequency band network, and determines to obtain data of a data service in downlink data by using a second frequency band network. Referring to FIG. 2, an embodiment of the data processing method in the embodiments of this application includes the following steps.

201: A terminal separately establishes communication connections to a first frequency band network of a router and a second frequency band network of the router.

A user side enables a wireless fidelity (Wi-Fi) connection of a terminal, the terminal supports real simultaneous dual band (RSDB), the terminal connects to the first frequency band network of the router and the second frequency band network of the router, and the router is a dual-band router, that is, the terminal separately establishes communication connections to the first frequency band network and the second frequency band network.

It should be noted that the first frequency band network and the second frequency band network of the router may be networks of two frequency bands of a same service set identifier (SSID) of the router, or may respectively be band networks of two SSIDs of the router. This is not specifically limited herein.

Figure 3:
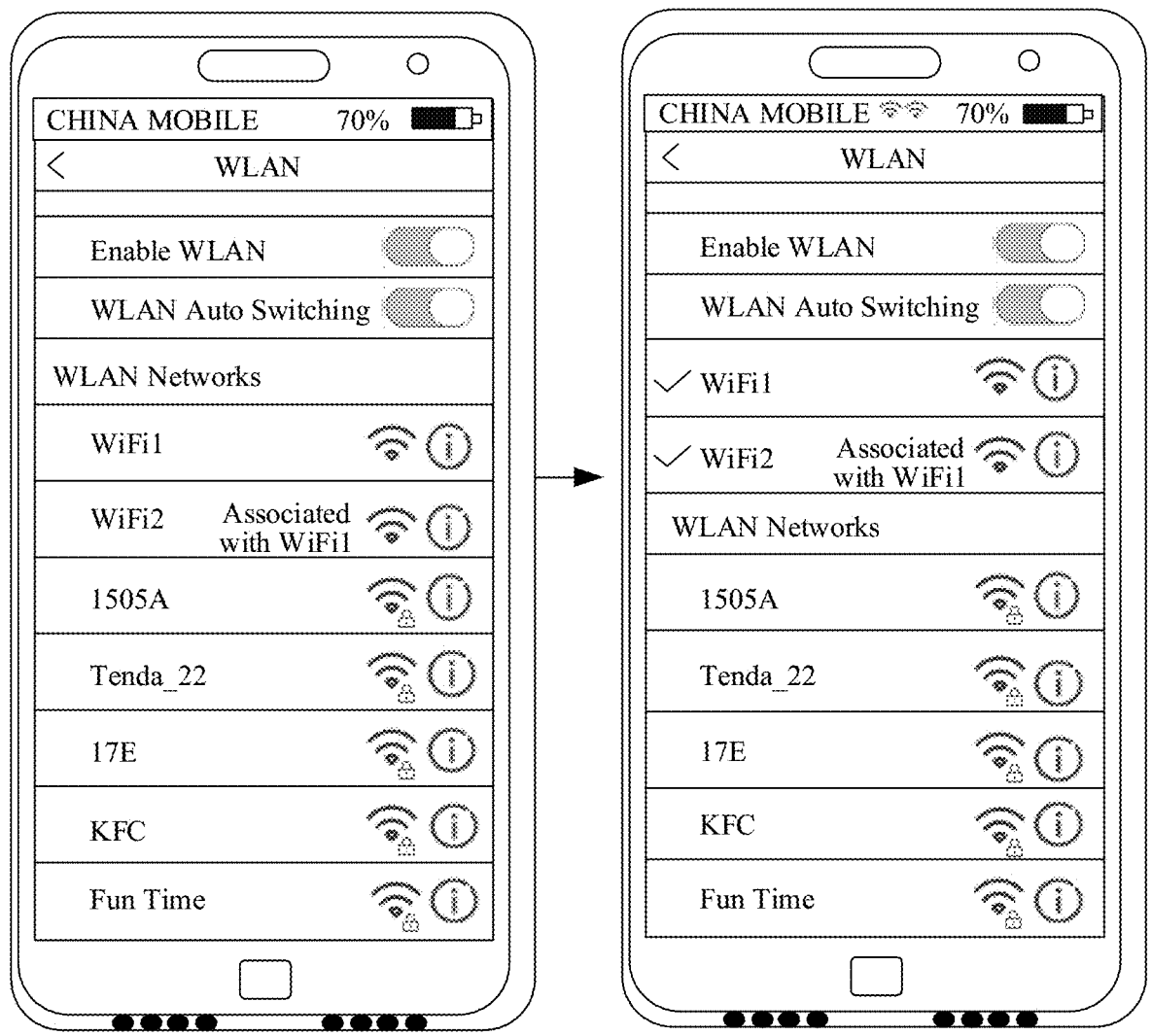
FIG. 3 is a schematic diagram of a scenario of a data processing method according to an embodiment of this application.

In an implementation scenario, the router has two SSIDs, a first frequency band network is a frequency band network under one of the SSIDs, a second frequency band network is a frequency band network under the other SSID of the router, and when a connection password is set for the first frequency band network of the router and the second frequency band network of the router, a user needs to enter the password for connection. When the first frequency band network and the second frequency band network of the router are separately displayed in a mobile phone interface, as shown in FIG. 3, WiFi1 is the first frequency band network of the router, and WiFi2 is the second frequency band network of the router. If "associated with WiFi1" is marked in the frequency band network of WiFi2, it indicates that WiFi1 and WiFi2 are networks of different frequency bands of a same router. Alternatively, "associated with WiFi1" may be marked in a frequency band network of WiFi1, or is not marked. This is not specifically limited herein. In this application, an example in which "associated with WiFi" is marked in WiFi2 is used for description. A name and a password of each frequency band network may be freely set. For example, the name of the first frequency band network may be set to wifi-2.4 GHz, and the name of the second frequency band network may be set to wife-5 GHz. This is not specifically limited herein. In this application, only the name and the password in FIG. 3 are used as an example for description. In FIG. 3, a user enables a wireless connection button, and the terminal may simultaneously be connected to two frequency band networks: WiFi1 and WiFi2. When connection passwords are set for WiFi1 and WiFi2, for a connection process, refer to FIG. 4-a-1, FIG. 4-a-2, FIG. 4-b-1 and FIG. 4-b-2. A user enables a wireless connection button, then taps WiFi1, enters a connection password of WiFi1 in a pop-up interface, and then taps a connection button, to successfully connect to WiFi1; and then taps Wi-Fi2, enters a connection password of Wi-Fi2 in a pop-up interface, and then taps a connection button, to successfully connect to WiFi2, so that the terminal is synchronously connected to the dual-band networks.

Figure 5:
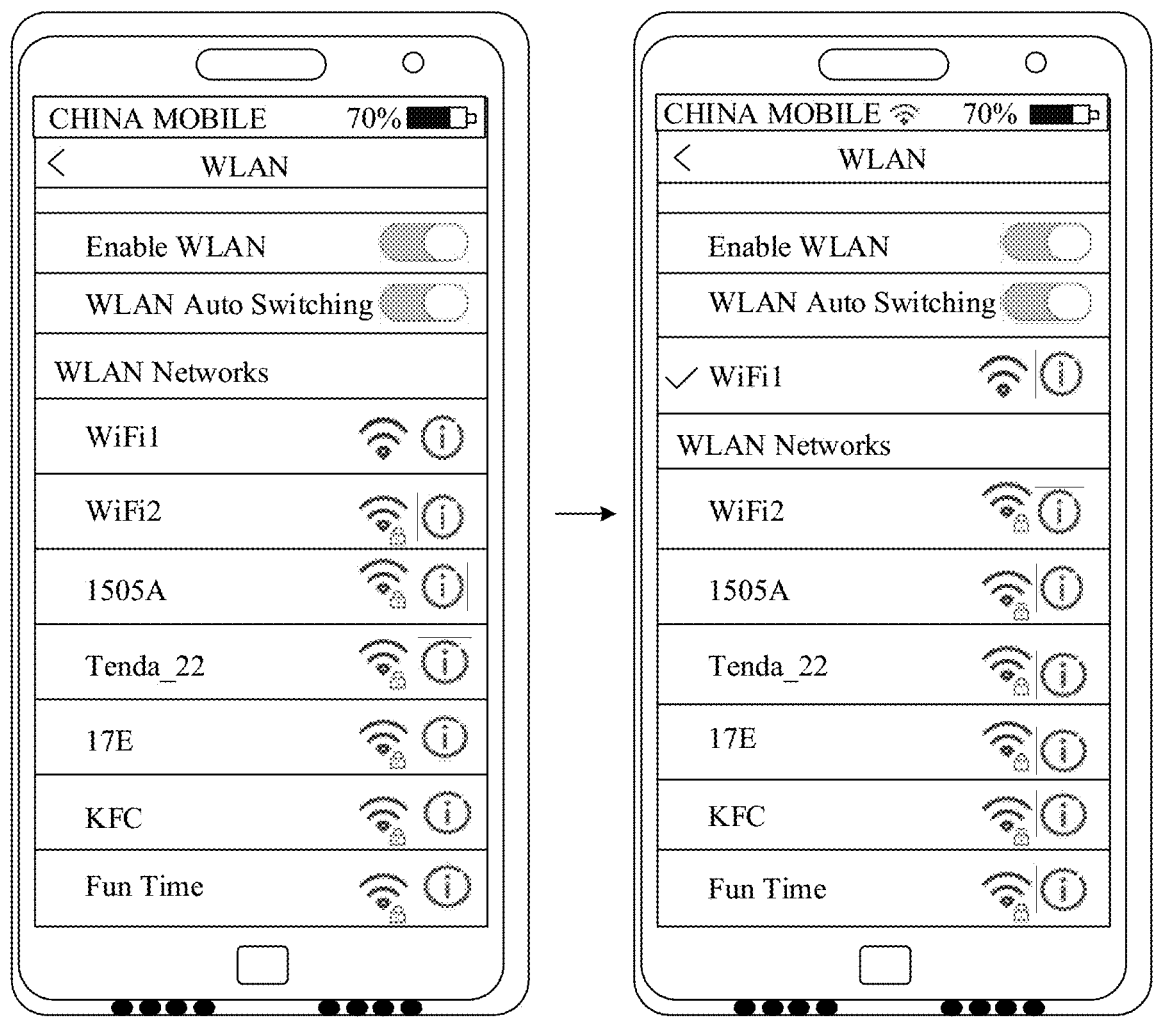
FIG. 5 is a schematic diagram of another scenario of a data processing method according to an embodiment of this application.
Figures 1, 6:
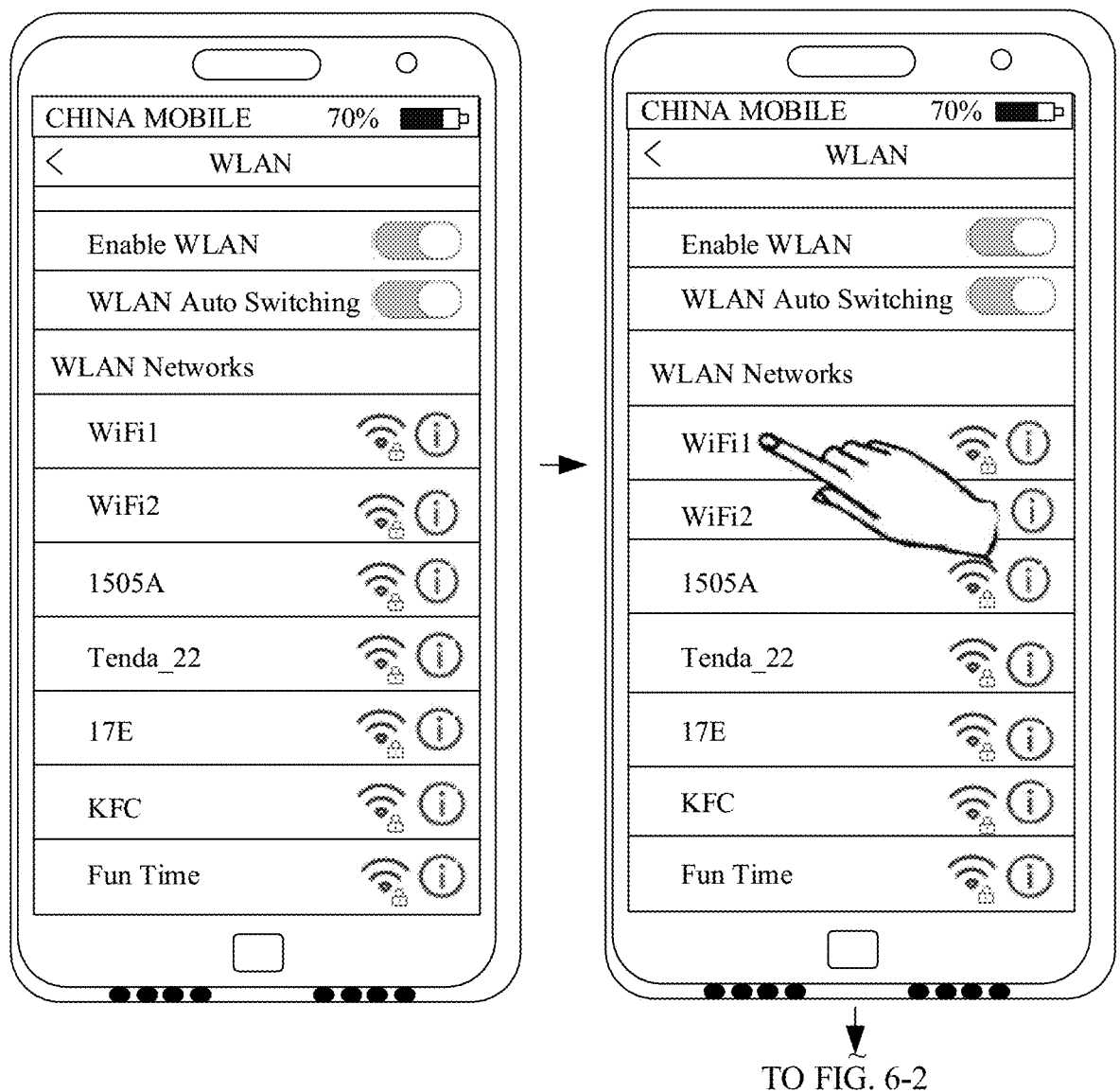
Figures 2, 6:
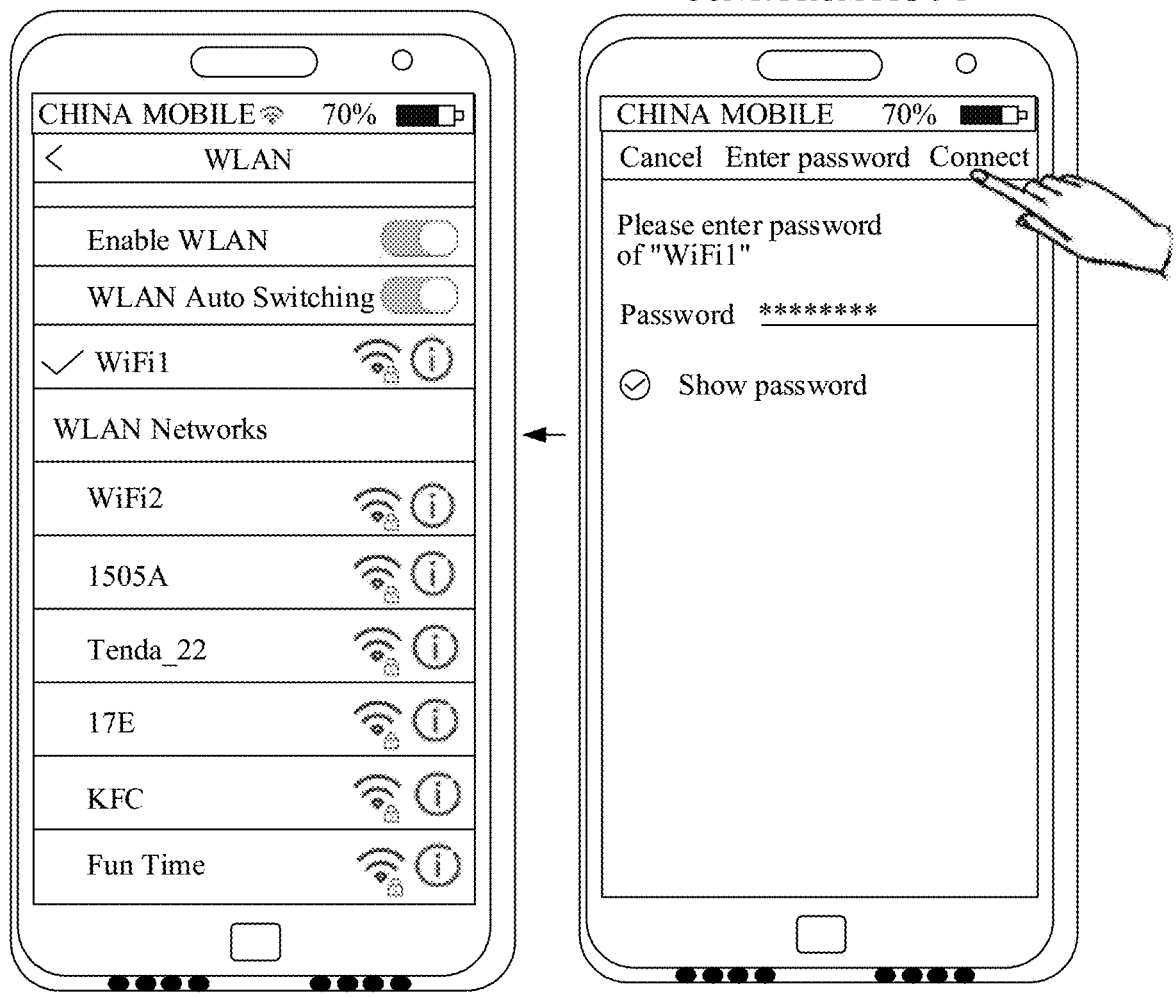

In a possible implementation scenario, the router has one SSID, where the first frequency band network and the second frequency band network are two frequency band networks under the SSID, and when the first frequency band network and the second frequency band network are displayed in a mobile phone interface as same Wi-Fi, as shown in FIG. 5, WiFi1 is a first frequency band network and a second frequency band network of the router. When no connection password is set for WiFi1, and the user enables a wireless connection button, the terminal may connect to WiFi1, to implement synchronous connection of the terminal to the dual-band networks of the router. As shown in FIG. 6-1 and FIG. 6-2, when a connection password is set for WiFi1, the user enables a wireless connection button, and then the user taps WiFi1, enters a connection password of WiFi1 in a pop-up interface, and then taps the connection button, to successfully connect to WiFi1.

It should be noted that the first frequency band network may be a 2.4 GHz frequency band network, and the second frequency band network may be a 5 GHz frequency band network, or the first frequency band network may be a 5 GHz frequency band network, and the second frequency band network may be a 2.4 GHz frequency band network. This is not limited in this application.

202: The terminal transmits data by using the first frequency band network and the second frequency band network, where the data includes uplink data and downlink data.

After the terminal separately establishes the communication connection to the first frequency band network of the router and the second frequency band network of the router, the terminal may transmit the data by using the first frequency band network and the second frequency band network. The data transmitted by using the first frequency band network includes the uplink data and the downlink data, the data transmitted by using the second frequency band network includes the uplink data and the downlink data, where the uplink data includes uplink control data, and the downlink data includes data of a data service. In this case, in a process in which the terminal transmits the data by using the two frequency band networks, a service load amount of each frequency band network changes with a service volume in the frequency band network.

203: The terminal determines that a service load amount of the first frequency band network is greater than a first preset threshold.

In step 202, after being connected to the first frequency band network and the second frequency band network, the terminal transmits data by using the first frequency band network and the second frequency band network. In this case, a service load status of the first frequency band network and a service load status of the second frequency band network change with the service volume in each frequency band network, in a process in which the terminal transmits the data by using the first frequency band network and the second frequency band network, the terminal detects the service load amount of the first frequency band network. After the detection, the terminal may determine that the current service load amount of the first frequency band network is greater than the first preset threshold, and the first preset threshold is related to a bandwidth of the first frequency band network. Specifically, the terminal may determine that total traffic of the downlink data transmitted in the first frequency band network is greater than 80% of the bandwidth of the first frequency band network, that is, the first preset threshold may be 80% of the bandwidth of the first frequency band network. In this case, the terminal may determine that the service load amount of the first frequency band network is greater than the first preset threshold. The terminal may further determine the service load amount of the first frequency band network in another manner. This is not specifically limited herein. For example, if a current bandwidth of the first frequency band network is 100 M/s, and total traffic of downlink data transmitted in the first frequency band network is 81 M, in this case, the terminal may determine that the service load amount of the first frequency band network is greater than the first preset threshold.

It should be noted that the terminal may detect the service load amount of the first frequency band network based on a preset period. For example, the terminal may perform detection once every five minutes or once every 10 minutes. This is not specifically limited herein.

204: The terminal determines data of a data service in the downlink data.

After the terminal determines that the service load amount of the first frequency band network is greater than the first preset threshold, the terminal determines the data of the data service in the downlink data. Specifically, the terminal may determine the data of the data service by using a port number of the data carried in a packet header in a packet of the downlink data, or the terminal may determine the data of the data service based on a data frame of a packet of the downlink data. This is not specifically limited herein. For example, the terminal obtains the downlink data by using the first frequency band network and the second frequency band network, where the downlink data includes data of a video service, data of an audio service, and data of a data service, and the data of the data service is a service with a relatively large download volume, the terminal needs to occupy a large amount of traffic to download the data of the data service. In this case, the terminal may determine the data of the data service based on service types of these services, so that the terminal subsequently uses a corresponding frequency band network to obtain the data of the data service for the data with a relatively large download volume.

In this embodiment, there is no fixed execution sequence between step 203 and step 204. Step 203 may be performed first, or step 204 may be performed first, or step 203 and step 204 may simultaneously be performed based on a situation. This is not specifically limited herein.

205: The terminal determines uplink control data in the uplink data.

That the terminal determines the uplink control data in the uplink data may be that the terminal determines the uplink control data in the uplink data by using a packet transmission protocol of the uplink data. For example, the terminal transmits the uplink data by using the first frequency band network and the second frequency band network. The uplink data includes uplink control data. For example, the uplink control data transmitted by the terminal includes data of a data service uploaded by the terminal, an acknowledgment (ACK) packet, a control packet that has a relatively high latency requirement, and the like. The data of the data service may be a traffic intensive data packet uploaded by a user side to a server, and in this case, the terminal may determine uplink control data in the uplink data based on a packet type, for example, an ACK packet, or a packet that has a relatively high latency requirement, so that the terminal subsequently uploads the uplink control data by using a corresponding frequency band network.

206: The terminal determines to transmit the data of the data service by using the second frequency band network and transmit the uplink control data by using the first frequency band network.

After the terminal determines that the service load amount of the first frequency band network is greater than the first preset threshold, the terminal may determine that the service load amount of the first frequency band network is relatively large, and after the terminal determines the data of the data service in the downlink data and the uplink control data in the uplink data, the terminal may determine to transmit the data of the data service in the downlink data by using the second frequency band network, and determine to transmit the uplink control data by using the first frequency band network. In this way, the data of the data service and the uplink control data are separated to inter-frequency channels for transmission, so that a service stalling problem caused by congestion of a control packet can be reduced.

207: The terminal obtains the data of the data service by using the second frequency band network, and uploads the uplink control data by using the first frequency band network.

After the terminal determines to transmit the data of the data service by using the second frequency band network and transmit the uplink control data by using the first frequency band network, the terminal may obtain the data of the data service by using the second frequency band network and upload the uplink control data by using the first frequency band network. For example, in step 204, the downlink data includes data of a data service, data of an audio service, and data of a video service. After the terminal determines the data of the data service, the terminal may transmit the data of the data service by using the second frequency band network. The uplink data includes an uplink control packet and the like. In this case, the terminal may transmit the uplink control data by using the first frequency band network. For example, in a transmission process of data of a video service, after receiving a data packet sent by a server, a terminal side feeds back an ACK packet to the server. In this case, the ACK packet is transmitted to the server by using the second frequency band network, and can be transmitted to the server in time. The server may continue to deliver a data packet of the video service, and if the terminal side continuously receives data packets sent by the server, the video can be smoothly played. Therefore, smoothness of the video service is improved.

In this embodiment of this application, the terminal establishes the communication connection to the first frequency band network of the router and the second frequency band network of the router, and then the terminal transmits the data by using the first frequency band network and the second frequency band network. The data includes the uplink data and the downlink data. The terminal determines that the service load amount of the first frequency band network is greater than the first preset threshold, the terminal determines the data of the data service in the downlink data and the uplink control data in the uplink data, and then the terminal determines to transmit the data of the data service by using the second frequency band network and transmit the uplink control data by using the first frequency band network, and the terminal may transmit the data of the data service data by using the second frequency band network, and transmit the uplink control data by using the first frequency band. Therefore, when the service load amount of the first frequency band network is greater than the first preset threshold, the terminal may transmit the data of the data service by using the first frequency band network and transmit the uplink control data by using the second frequency band network. Therefore, in a traffic intensive usage scenario, the data of the data service and the uplink control data are transmitted by using an inter-frequency channel, to reduce a service stalling problem caused by packet congestion, thereby improving user experience.

When the terminal determines that the service load amount of the first frequency band network is greater than the first preset threshold and the service load amount of the second frequency band network is greater than the second preset threshold, the terminal may determine to transmit the data of the data service by using the second frequency band network and transmit the uplink control data by using the first frequency band network. In addition, the terminal may determine to preferentially transmit the uplink control data in the first frequency band network. That the terminal determines to preferentially transmit the uplink data in the first frequency band network may be that the terminal places the uplink control data in a high-priority queue in the first frequency band network, and the terminal determines to preferentially transmit the uplink control data in the high-priority queue in the first frequency band network. Alternatively, the terminal may label the uplink control data, and then the terminal determines, based on the label, to preferentially transmit the uplink control data in the first frequency band network. When data is transmitted in the first frequency band network, when the terminal identifies the label by using the uplink control data, the terminal preferentially transmits the uplink control data. For example, the terminal may perform a quality of service (QoS) policy by using uplink control data transmitted in the first frequency band network. The terminal may label a differentiated service code point (DSCP) field in the uplink control data. When the terminal transmits the data in the first frequency band network, if the terminal detects that the transmitted data includes the label, the terminal preferentially transmits the uplink control data. This is not limited in this application. In a subsequent embodiment, an example in which the terminal labels the uplink control data is merely used for description.

Figure 7:
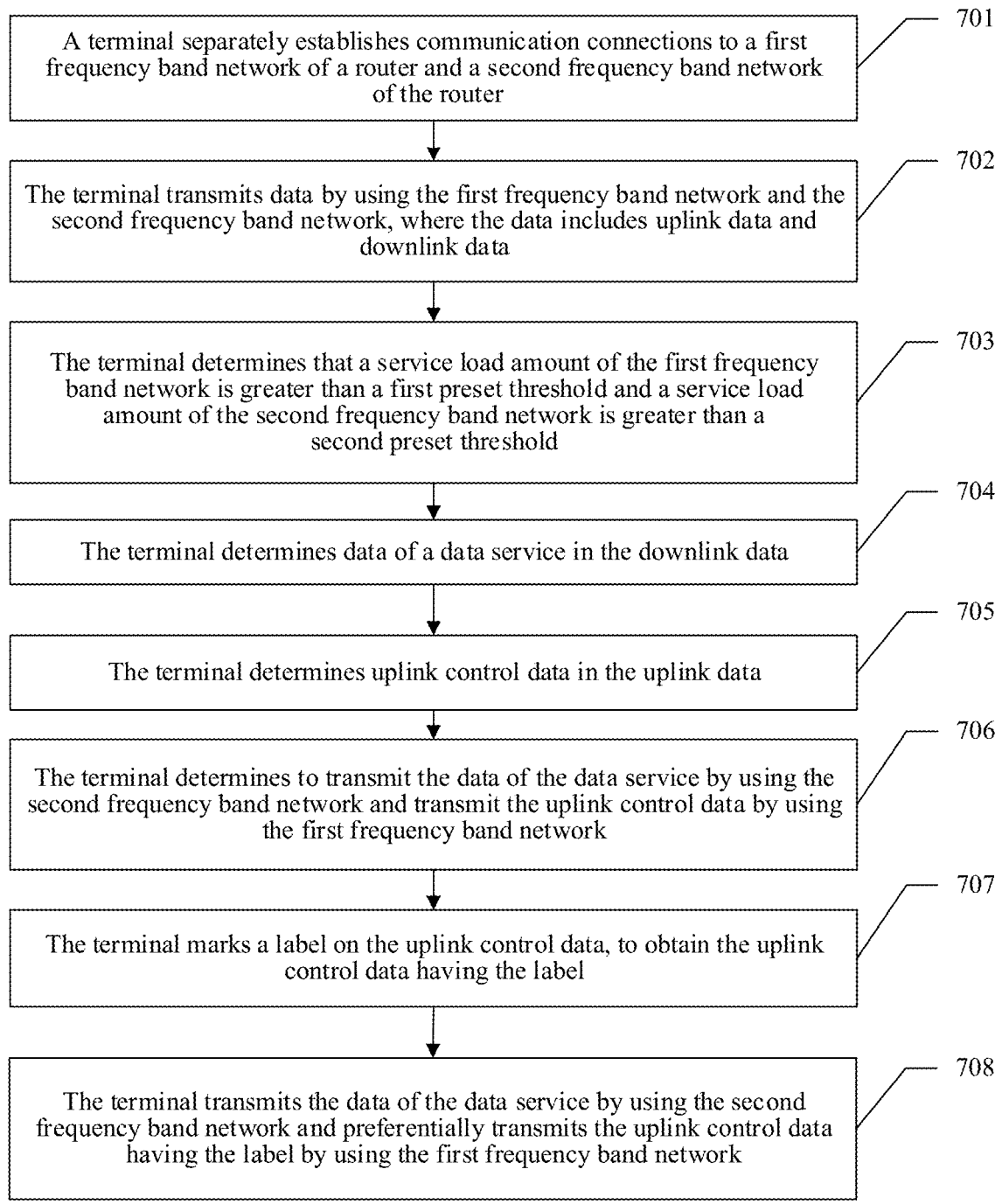
FIG. 7 is a schematic diagram of another embodiment of a data processing method according to the embodiments of this application.

When the terminal determines that the service load amount of the first frequency band network is greater than a first preset threshold and the service load amount of the second frequency band network is greater than a second preset threshold, the terminal determines to obtain the data of the data service by using the second frequency band network and transmit the uplink control data by using the first frequency band network; and marks a label on the uplink control data in the first frequency band network, so that the terminal preferentially transmits the uplink control data in the first frequency band network. Referring to FIG. 7, an embodiment of a data processing method in the embodiments of this application includes the following steps.

701: A terminal separately establishes communication connections to a first frequency band network of a router and a second frequency band network of the router.

702: The terminal transmits data by using the first frequency band network and the second frequency band network, where the data includes uplink data and downlink data.

Step 701 and step 702 are similar to step 201 and step 202 in FIG. 2, and details are not described herein again.

703: The terminal determines that a service load amount of the first frequency band network is greater than a first preset threshold and a service load amount of the second frequency band network is greater than a second preset threshold.

In step 702, after the terminal is connected to the first frequency band network and the second frequency band network, the terminal transmits the data by using the first frequency band network and the second frequency band network. In this case, a service load status of the first frequency band network and a service load status of the second frequency band network change with the service volume in each frequency band network. In a process in which the terminal transmits data by using the first frequency band network and the second frequency band network, the terminal detects a service load amount of the first frequency band network and a service load amount of the second frequency band network. After the detection succeeds, the terminal may determine that a current service load amount of the first frequency band network is greater than a first preset threshold and a current service load amount of the second frequency band network is greater than a second preset threshold, where the first preset threshold is related to the first frequency band network and a bandwidth value of the first frequency band network, and the second preset threshold is related to a bandwidth value of the second frequency band network. For example, if the terminal may determine that total traffic of downlink data transmitted in the first frequency band network is greater than 80% of a bandwidth of the first frequency band network, the first preset threshold is 80% of the bandwidth of the first frequency band network, and the terminal may determine that the service load amount of the first frequency band network is greater than the first preset threshold. If the terminal determines that the total downlink data traffic transmitted in the second frequency band network is greater than 80% of a bandwidth of the second frequency band network, the second preset threshold is 80% of the bandwidth of the second frequency band network, and the terminal may determine that the service load amount of the second frequency band network is greater than the second preset threshold. The terminal may further determine the service load amount of the first frequency band network and the service load amount of the second frequency band network in another manner. This is not specifically limited herein. For example, if a current bandwidth of the first frequency band network is 150 M/s, and total traffic of the downlink data transmitted in the first frequency band network is 130 M, the terminal may determine that a service load amount of the first frequency band network is greater than a first preset threshold. If a current bandwidth of the second frequency band network is 300 M/s, and total traffic of the downlink data transmitted in the second frequency band network is 260 M, the terminal may determine that the service load amount of the second frequency band network is greater than the second preset threshold.

It should be noted that in a process in which the terminal transmits data by using the first frequency band network and the second frequency band network, the terminal may continuously detect a service load status of each frequency band network, or may detect a service load status of each frequency band network based on preset duration. The preset duration may be 10 minutes, five minutes, or the like. This is not limited in this application.

704: The terminal determines data of a data service in the downlink data.

705: The terminal determines uplink control data in the uplink data.

Step 704 to step 705 are similar to step 204 to step 205 in FIG. 2, and details are not described herein again.

706: The terminal determines to transmit the data of the data service by using the second frequency band network and transmit the uplink control data by using the first frequency band network.

After the terminal determines that the service load amount of the first frequency band network is greater than the first preset threshold and the service load amount of the second frequency band network is greater than the second preset threshold, the terminal may determine to transmit the data of the data service in the downlink data by using the second frequency band network and determine to transmit the uplink control data by using the first frequency band network. In this way, the control packet and the data of the data service are separated to inter-frequency channels for transmission, so that a service stalling problem caused by packet congestion can be reduced.

707: The terminal marks a label on the uplink control data, to obtain the uplink control data having the label.

After the terminal determines to transmit the uplink control data by using the first frequency band network, the terminal marks a label on the uplink control data, where the label is used to instruct the terminal to preferentially transmit the uplink control data in the first frequency band network. Therefore, in a traffic intensive scenario, the terminal performs a QoS policy on an uplink control packet transmitted in the first frequency band network, that is, marks a label on the uplink control packet, to implement high-priority transmission of the uplink control packet, and separate the uplink control packet from data of a data service to the inter-frequency channels for transmission. For example, specifically, the terminal may label a DSCP field in the uplink control data. Therefore, the uplink control packet is transmitted by using a dedicated frequency band network, and is transmitted with a high priority, so that a service stalling problem caused by packet congestion can be reduced.

708: The terminal transmits the data of the data service by using the second frequency band network and preferentially transmits the uplink control data having the label by using the first frequency band network.

After the terminal determines to transmit the data of the data service by using the second frequency band network and transmit the uplink control data by using the first frequency band network, the terminal may transmit the data of the data service by using the second frequency band network, and preferentially transmit the marked uplink control data by using the first frequency band network. For example, in the first frequency band network, data of a video service is being transmitted, and in this case, the uplink control data having the label is also transmitted in the first frequency band network. If the terminal detects, when the data of the video service is transmitted, that the uplink control data having the label is behind the data of the video service, the terminal first transmits the uplink control data having the label, and then transmits the data of the video service, to reduce, to some extent, a service stalling problem caused by control packet congestion.

In this embodiment of this application, the terminal establishes the communication connection to the first frequency band network of the router and the second frequency band network of the router, and then the terminal transmits the data by using the first frequency band network and the second frequency band network. The data includes the uplink data and the downlink data. When the terminal determines that the service load amount of the first frequency band network is greater than a first preset threshold and the service load amount of the second frequency band network is greater than a second preset threshold, the terminal determines the data of the data service in the downlink data and the uplink control data in the uplink data, and then the terminal may determine to obtain the data of the data service by using the second frequency band network, transmit the uplink control data by using the first frequency band network, and mark a label on the uplink control data in the first frequency band network. The label is used to instruct the terminal to preferentially transmit the uplink control data in the first frequency band network, and then the terminal may transmit the data of the data service by using the second frequency band network and transmit the uplink control data by using the first frequency band network. When transmitting data in the first frequency band network, the terminal preferentially transmits the uplink control data based on the label. Therefore, when the service load amount of the first frequency band network is greater than the first preset threshold and the second frequency band network is greater than the second preset threshold, the terminal obtains the data of the data service by using the second frequency band network, transmits the uplink control data by using the first frequency band network, and preferentially transmits the uplink control data in the first frequency band network. Therefore, in a traffic intensive usage scenario, data of the data service and uplink control data are transmitted by using an inter-frequency channel, and the uplink control data is preferentially processed in the first frequency band network, to reduce occurrence of a problem of service stalling caused by packet congestion, thereby improving user experience.

Figure 8:
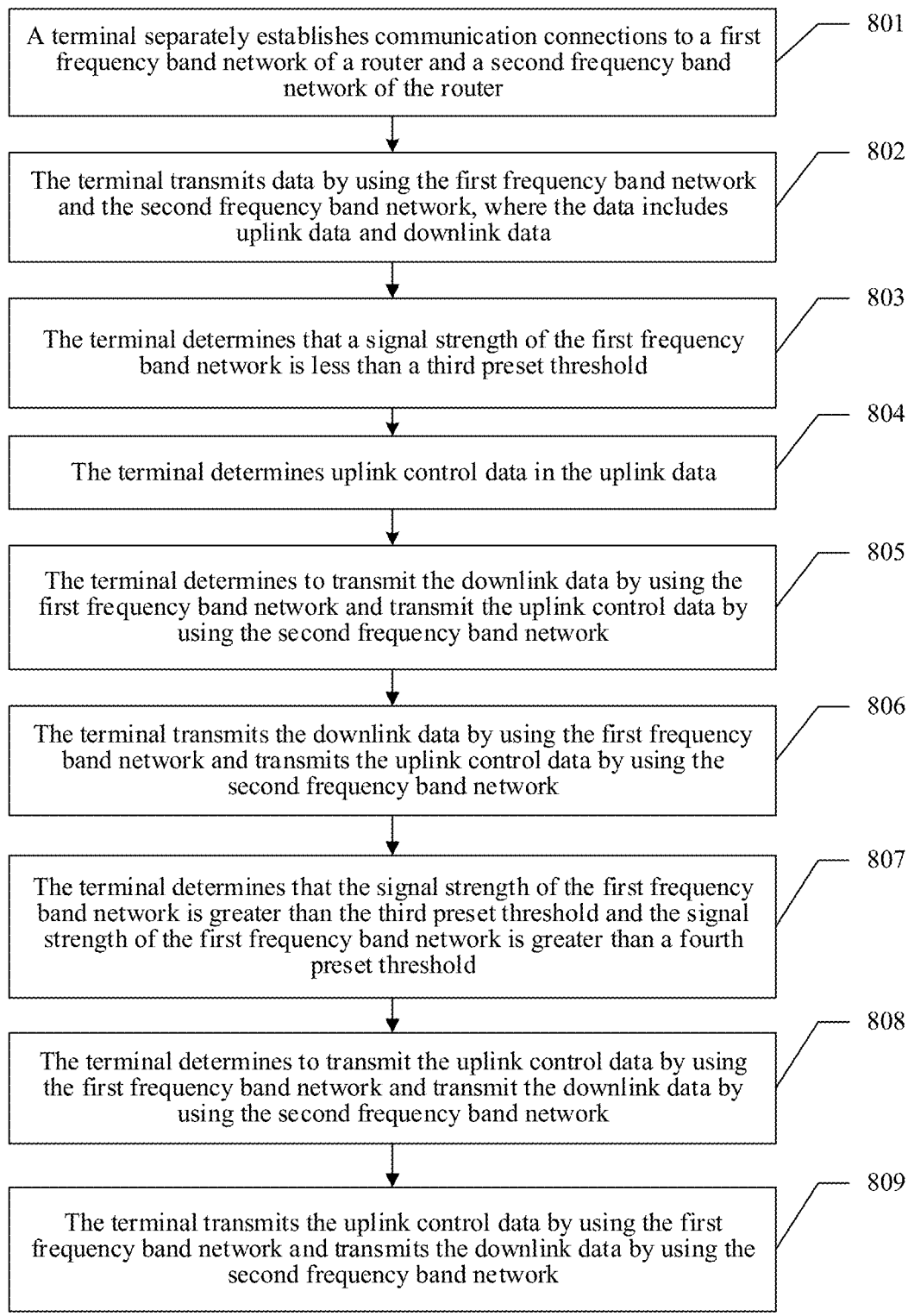
FIG. 8 is a schematic diagram of another embodiment of a data processing method according to the embodiments of this application.

When the terminal determines that the signal strength of the second frequency band network is less than the third preset threshold, the terminal may determine to obtain the downlink data by using the first frequency band network and upload the uplink control data by using the second frequency band network. When the terminal determines that the signal strength of the second frequency band network is greater than the third preset threshold and the signal strength of the first frequency band network is greater than the fourth preset threshold, the terminal determines to obtain the downlink data by using the second frequency band network and upload the uplink control data by using the first frequency band network. Referring to FIG. 8, another embodiment of a data processing method in the embodiments of this application includes the following steps.

801: A terminal separately establishes communication connections to a first frequency band network of a router and a second frequency band network of the router.

802: The terminal transmits data by using the first frequency band network and the second frequency band network, where the data includes uplink data and downlink data.

Step 801 to step 802 are similar to step 201 to step 202 in FIG. 2, and details are not described herein again.

803: The terminal determines that a signal strength of the second frequency band network is less than a third preset threshold.

In step 802, the terminal transmits the data by using the first frequency band network and the second frequency band network. In this case, the terminal detects a signal strength of the first frequency band network, and after the detection, the terminal may determine that the signal strength of the first frequency band network is less than the third preset threshold. The terminal may determine the signal strength of the second frequency band network by using a received signal strength indicator (RSSI). When the RSSI is less than—72 dBm, it may be considered that the signal strength of the first frequency band network is relatively weak.

It should be noted that the terminal may detect the signal strength of the second frequency band network based on preset duration, and may perform detection once every five minutes, or may perform detection once every 10 minutes. This is not specifically limited herein.

804: The terminal determines uplink control data in the uplink data.

Step 804 is similar to step 205 in FIG. 2, and details are not described herein again.

805: The terminal determines to transmit the downlink data by using the first frequency band network and transmit the uplink control data by using the second frequency band network.

When the signal strength of the second frequency band network is less than the third preset threshold, because the terminal determines that the signal strength of the second frequency band network is relatively weak in this case, it is not suitable to transmit traffic intensive data, data of a video service, or the like by using the second frequency band network. Therefore, in this case, the terminal may transmit the downlink data by using the first frequency band network, and then the uplink control data is transmitted by using the second frequency band network. Because an uplink control data packet is relatively small, even if the signal strength of the second frequency band network is relatively weak in this case, to some extent, the terminal may transmit the uplink control data to the server side in time, so that a service stalling problem caused by packet congestion can be reduced, thereby improving user experience.

806: The terminal obtains the downlink data by using the first frequency band network and uploads the uplink control data by using the second frequency band network.

In step 805, if the terminal determines a transmission policy of transmitting the downlink data by using the first frequency band network and transmitting the uplink control data by using the second frequency band network when the signal strength of the second frequency band network is relatively weak, the terminal may transmit the downlink data by using the first frequency band network and transmit the uplink control data by using the second frequency band network.

807: The terminal determines that the signal strength of the second frequency band network is greater than the third preset threshold and the signal strength of the first frequency band network is greater than a fourth preset threshold.

In a process of transmitting data by the terminal, the terminal detects a signal strength of the first frequency band network and a signal strength of the second frequency band network. After the detection, the terminal may determine that the signal strength of the second frequency band network is greater than the third preset threshold and that the signal strength of the fourth frequency band network is greater than the fourth preset threshold. Specifically, the terminal may determine the signal strength of the first frequency band network by using the received RSSI. When the RSSI is greater than −72 dBm, it may be considered that the signal strength of the first frequency band network is restored. The terminal may determine the signal strength of the second frequency band network by using the RSSI of the second frequency band network. Generally, when the RSSI of the first frequency band network is greater than −65 dBm, it may be considered that the signal strength of the first frequency band network is relatively strong. Therefore, the fourth preset threshold may be −65 dBm.

808: The terminal determines to transmit the uplink control data by using the first frequency band network and transmit the uplink data by using the second frequency band network.

When the signal strength of the second frequency band network is greater than the third preset threshold and the signal strength of the first frequency band network is greater than the fourth preset threshold, the terminal may determine that the signal strength of the first frequency band network is relatively strong, and the signal strength of the second frequency band network is restored. In this case, the terminal may determine to transmit the uplink control data by using the first frequency band network and transmit the downlink data by using the second frequency band network. In this way, the terminal may transmit the uplink control data to the server side in time by using the first frequency band network.

809: The terminal transmits the uplink control data by using the first frequency band network and transmits the uplink data by using the second frequency band network.

After the terminal determines that the signal strength of the first frequency band network is greater than the third preset threshold and the signal strength of the second frequency band network is greater than the fourth preset threshold, the terminal may determine a transmission policy of transmitting the uplink control data by using the first frequency band network and transmitting the uplink data by using the second frequency band network, and in this case, the terminal may transmit the uplink control data by using the first frequency band network and transmit the uplink data by using the second frequency band network. For example, the uplink control data includes an ACK packet, a packet that has a relatively high latency requirement, and the like, and the downlink data includes data of a video service. In this case, the terminal transmits the control packets by using the first frequency band network. Because the first frequency band network is relatively strong in this case, the control packets may be transmitted to the server side in time, the server may continue to deliver a data packet of the video service, and the terminal side continuously receives the data packet sent by the server, so that the video can be smoothly played. Therefore, smoothness of the video service is improved, thereby improving user experience.

In this embodiment of this application, the terminal establishes the communication connection to the first frequency band network of the router and the second frequency band network of the router, and then the terminal transmits the data by using the first frequency band network and the second frequency band network. The data transmitted by using the first frequency band network includes the uplink data and the downlink data, the data transmitted by the second frequency band network includes the uplink data and the downlink data. The terminal may determine that the signal strength of the second frequency band network is less than the third preset threshold, and the terminal may determine to obtain the downlink data by using the first frequency band network and upload the uplink control data by using the second frequency band network. When the terminal determines that the signal strength of the second frequency band network is greater than the third preset threshold and the signal strength of the first frequency band network is greater than the fourth preset threshold, the terminal may determine to obtain the downlink data by using the second frequency band network and upload the uplink control data by using the first frequency band network. Therefore, when the signal strength of the second frequency band network is less than the third preset threshold, the terminal transmits the downlink data by using the first frequency band network, and the terminal uploads the uplink control data by using the second frequency band network. For example, the first frequency band network is a network of 2.4 GHz, and the second frequency band is a network of 5 GHz. When the signal strength of the second frequency band network is less than the third preset threshold, the terminal may obtain the downlink data by using the first frequency band network and upload the uplink control data by using the second frequency band network. This may reduce, to some extent, a distance-sensitive problem of the 5 GHz frequency band network, thereby improving user experience of using the 5 GHz frequency band network.

Figure 9:
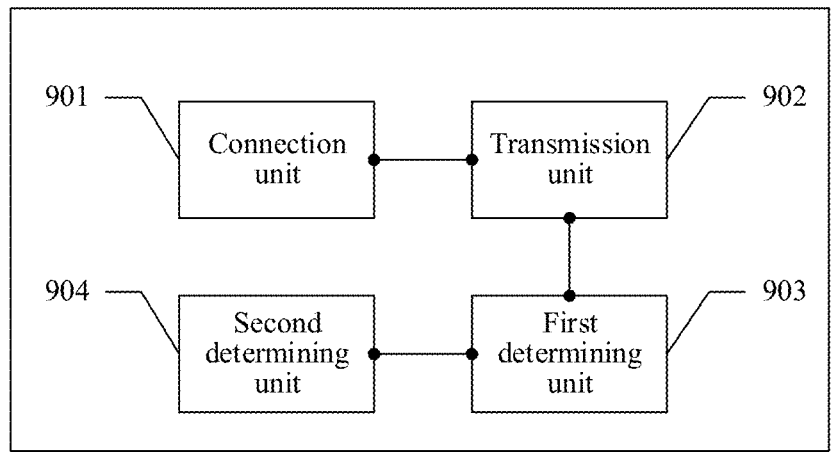
FIG. 9 is a schematic structural diagram of a terminal according to an embodiment of this application.

The data processing method in the embodiments of this application is described above. A terminal in the embodiments of this application is described below. Referring to FIG. 9, a second determining unit 904 is an optional unit. An embodiment of the terminal in the embodiments of this application includes:

a connection unit 901, configured to separately establish communication connections to a first frequency band network of a router and a second frequency band network of the router;

a transmission unit 902, configured to transmit data by using the first frequency band network and the second frequency band network, where the data includes uplink data and downlink data;

a first determining unit 903, configured to determine, based on a transmission status of the first frequency band network and a transmission status of the second frequency band network, to obtain the downlink data by using the second frequency band network and transmit the uplink data by using the first frequency band network; and the transmission unit 902, configured to transmit the downlink data by using the second frequency band network and transmit the uplink data by using the first frequency band network.

In this embodiment, the first determining unit 903 is specifically configured to:

determine, based on a service load amount of the first frequency band network and a service load amount of the second frequency band network, to transmit the downlink data by using the second frequency band network and transmit the uplink data by using the first frequency band network.

In this embodiment, the downlink data includes data of a data service, and the uplink data includes uplink control data. The transmission status of the first frequency band network and the transmission status of the second frequency band network include: the service load amount of the first frequency band network is greater than a first preset threshold. The first determining unit 903 is specifically configured to:

determine to transmit the data of the data service by using the second frequency band network; and determine to transmit the uplink control data by using the first frequency band network.

In this embodiment, the downlink data includes the data of the data service, and the uplink data includes uplink control data. The transmission status of the first frequency band network and the transmission status of the second frequency band network include: the service load amount of the first frequency band network is greater than the first preset threshold, and the service load amount of the second frequency band network is greater than a second preset threshold. The first determining unit 903 is specifically configured to:

determine to transmit the data of the data service by using the second frequency band network; and determine to transmit the uplink control data by using the first frequency band network.

In this embodiment, the transmission unit 902 is specifically configured to:

transmit the data of the data service by using the second frequency band network; and preferentially transmit the uplink control data by using the first frequency band network.

In this embodiment, the transmission unit 902 is specifically configured to:

mark a label on a packet corresponding to the uplink control data; and preferentially transmit the uplink control data based on the label by using the first frequency band network.

In this embodiment, the transmission unit 902 is specifically configured to:

set a quantity of uplink control users into a high-priority queue of the first frequency band network; and preferentially transmit the uplink control data in the high-priority queue by using the first frequency band network.

In this embodiment, the terminal further includes:

a second determining unit 904, configured to determine data corresponding to a data service in the downlink data.

In this embodiment, the second determining unit 904 is specifically configured to:

determine, based on a port number of a packet of the downlink data, the data corresponding to the data service in the downlink data; or determine, based on a data frame in a packet of the downlink data, the data corresponding to the data service in the downlink data.

In this embodiment, the first frequency band network is a 2.4 GHz frequency band network. The second frequency band network is a 5 GHz frequency band network.

In this embodiment of this application, the connection unit 901 establishes the communication connection to the first frequency band network of the router and the second frequency band network of the router, and then the transmission unit 902 transmits the data by using the first frequency band network and the second frequency band network. The data includes the uplink data and the downlink data, the uplink data includes the uplink control data, and the downlink data includes the data of the data service. The first determining unit 903 may determine, based on the transmission status of the first frequency band network and the transmission status of the second frequency band network, to transmit the data of the data service by using the second frequency band network and transmit the uplink control data by using the first frequency band network, and in this case, the transmission unit 902 may transmit the data of the data service data by using the second frequency band network and transmit the uplink control data by using the first frequency band. Therefore, when the service load amount of the first frequency band network is greater than the first preset threshold, the terminal may transmit the data of the data service by using the first frequency band network and transmit the uplink control data by using the second frequency band network. Therefore, in a traffic intensive usage scenario, the data of the data service and the uplink control data are transmitted by using an inter-frequency channel, to reduce a service stalling problem caused by packet congestion, thereby improving user experience.

In this embodiment of this application, modules in the terminal shown in FIG. 9 may further implement the following content:

a connection unit 901, configured to separately establish communication connections to a first frequency band network of a router and a second frequency band network of the router;

a transmission unit 902, configured to transmit data by using the first frequency band network and the second frequency band network, where the data includes uplink data and downlink data;

a first determining unit 903, configured to determine, based on a signal strength of the first frequency band network and a signal strength of the second frequency band network, to correspondingly transmit the uplink data and the downlink data by using the second frequency band network and the first frequency band network; and the transmission unit 902, configured to correspondingly transmit the uplink data and the downlink data by using the second frequency band network and the first frequency band network.

In this embodiment, the uplink data includes uplink control data. The signal strength of the first frequency band network and the signal strength of the second frequency band network include: the signal strength of the second frequency band network is less than a third preset threshold. The first determining unit 903 is specifically configured to:

determine to transmit the downlink data by using the first frequency band network, and determine to transmit the uplink control data by using the second frequency band network.

In this embodiment, the uplink data includes uplink control data. The signal strength of the first frequency band network and the signal strength of the second frequency band network include: the signal strength of the first frequency band network is greater than a fourth preset threshold, and the signal strength of the second frequency band network is greater than a third preset threshold. The first determining unit 903 is specifically configured to:

determine to transmit the downlink data by using the second frequency band network, and determine to transmit the uplink control data by using the first frequency band network.

In this embodiment of this application, the connection unit 901 establishes the communication connection to the first frequency band network of the router and the second frequency band network of the router, and then the transmission unit 902 transmits the data by using the first frequency band network and the second frequency band network. The data transmitted by using the first frequency band network includes the uplink data and the downlink data, and the data transmitted by the second frequency band network includes the uplink data and the downlink data. When the signal strength of the second frequency band network is less than the third preset threshold, the first determining unit 903 may determine to obtain the downlink data by using the first frequency band network and upload the uplink control data by using the second frequency band network. When the signal strength of the second frequency band network is greater than the third preset threshold and the signal strength of the first frequency band network is greater than the fourth preset threshold, the first determining unit 903 may determine to obtain the downlink data by using the second frequency band network and upload the uplink control data by using the first frequency band network. Therefore, when the signal strength of the second frequency band network is less than the third preset threshold, the transmission unit 902 transmits the downlink data by using the first frequency band network, and the terminal uploads the uplink control data by using the second frequency band network. For example, the first frequency band network is a network of 2.4 GHz, and the second frequency band is a network of 5 GHz. When the signal strength of the second frequency band network is less than the third preset threshold, the transmission unit 902 may obtain the downlink data by using the first frequency band network and upload the uplink control data by using the second frequency band network. This may reduce, to some extent, a distance-sensitive problem of the 5 GHz frequency band network, thereby improving user experience of using the 5 GHz frequency band network.

Figure 10:
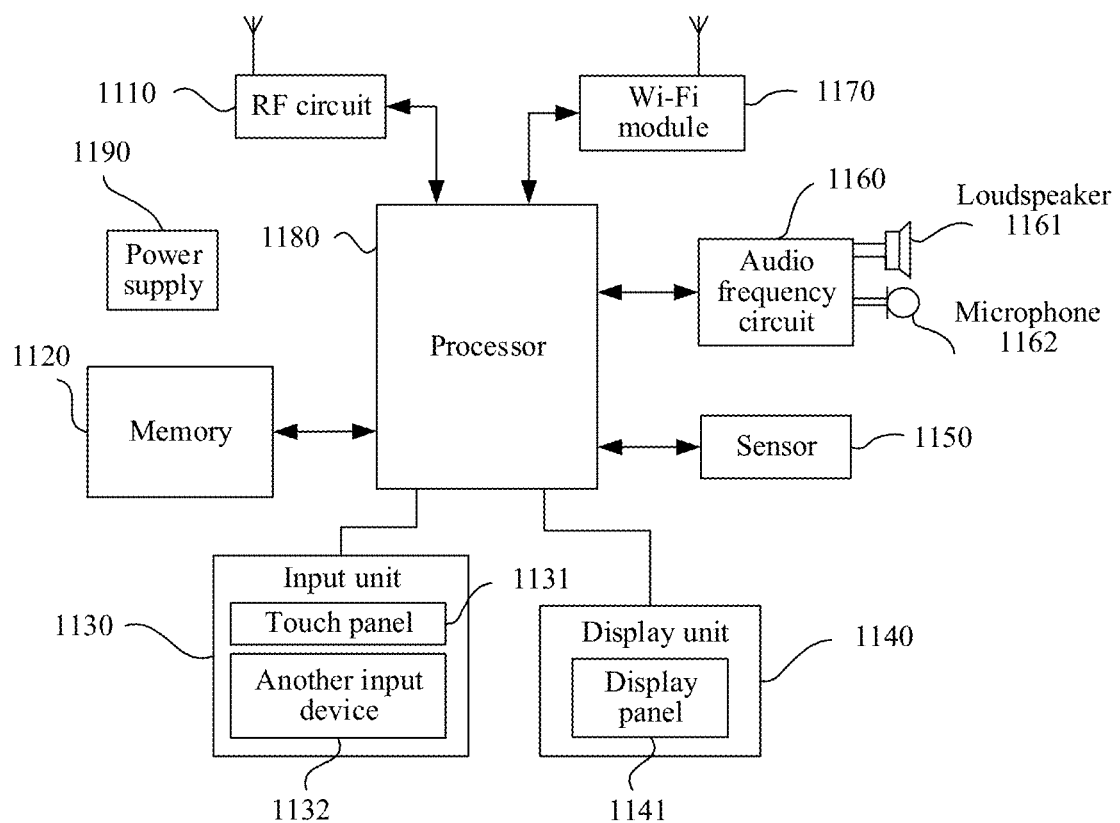
FIG. 10 is a schematic structural diagram of another terminal according to an embodiment of this application.

An embodiment of the present invention further provides another terminal. As shown in FIG. 10, for ease of description, only parts related to the embodiments of the present invention are shown. For specific technical details that are not disclosed, refer to the method part of the embodiments of the present invention. The terminal may be any terminal device, including a mobile phone, a tablet computer, a PDA (Personal Digital Assistant), a POS (Point of Sales), a vehicle-mounted computer, or the like. For example, the terminal is a mobile phone.

FIG. 10 is a block diagram of a partial structure of a mobile phone related to the terminal according to an embodiment of the present invention. Referring to FIG. 10, the mobile phone includes components such as a radio frequency (RF) circuit 1110, a memory 1120, an input unit 1130, a display unit 1140, a sensor 1150, an audio frequency circuit 1160, a wireless fidelity (Wi-Fi) module 1170, a processor 1180, and a power supply 1190. A person skilled in the art may understand that the structure of the mobile phone shown in FIG. 10 constitutes no limitation on the mobile phone. The mobile phone may include more or fewer components than those shown in the figure, may combine some components, or may have different component arrangements.

The following describes each constituent component of the mobile phone in detail with reference to FIG. 10.

The RF circuit 1110 may be configured to send and receive signals in an information sending and receiving process or a call process. The RF circuit 1110 receives downlink information from a base station, then delivers the downlink information to the processor 1180 for processing. In addition, the RF circuit 1110 sends uplink data to the base station. Usually, the RF circuit 1110 includes, but is not limited to, an antenna, at least one amplifier, a transceiver, a coupler, a low noise amplifier (LNA), a duplexer, and the like. In addition, the RF circuit 1110 may further communicate with a network and another device through wireless communications. Any communications standard or protocol may be used for the wireless communications, including but not limited to a Global System for Mobile Communications (GSM), a General Packet Radio Service (GPRS), Code Division Multiple Access (CDMA), Wideband Code Division Multiple Access (WCDMA), Long Term Evolution (LTE), an email, a short message service (SMS), and the like.

The memory 1120 may be configured to store a software program and a module. The processor 1180 runs the software program and module stored in the memory 1120, to perform various functional applications and data processing of the mobile phone. The memory 1120 may mainly include a program storage area and a data storage area. The program storage area may store an operating system, an application required by at least one function (such as a sound playback function and an image display function), and the like. The data storage area may store data (such as audio data and a phone book) created based on use of the mobile phone, and the like. In addition, the memory 1120 may include a high-speed random access memory, and may further include a nonvolatile memory, for example, at least one magnetic disk storage device, a flash storage device, or another volatile solid-state storage device.

The input unit 1130 may be configured to: receive input digital or character information, and generate a keyboard signal input related to a user setting and function control of the mobile phone. Specifically, the input unit 1130 may include a touch panel 1131 and another input device 1132. The touch panel 1131, also referred to as a touchscreen, may collect a touch operation performed by a user on or near the touch panel (for example, an operation performed by the user on the touch panel 1131 or near the touch panel 1131 by using any suitable object or accessory such as a finger or a stylus), and drive a corresponding connection apparatus based on a preset program. Optionally, the touch panel 1131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1180. Moreover, the touch controller can receive and execute a command sent from the processor 1180. In addition, the touch panel 1131 may be implemented in a plurality of types such as a resistive type, a capacitive type, an infrared type, a surface acoustic wave type. In addition to the touch panel 1131, the input unit 1130 may further include another input device 1132. Specifically, the another input device 1132 may include, but is not limited to, one or more of a physical keyboard, a functional key (such as a volume control key or a switch key), a trackball, a mouse, a joystick, and the like.

The display unit 1140 may be configured to display information input by the user or information provided for the user, and various menus of the mobile phone. The display unit 1140 may include a display panel 1141. Optionally, the display panel 1141 may be configured by using a liquid crystal display (LCD), an organic light-emitting diode (OLED), or the like. Further, the touch panel 1131 may cover the display panel 1141. After detecting a touch operation on or near the touch panel 1131, the touch panel 1131 transfers the touch operation to the processor 1180, to determine a type of a touch event, and then the processor 1180 provides a corresponding visual output on the display panel 1141 based on the type of the touch event. In FIG. 10, the touch panel 1131 and the display panel 1141 are used as two independent components to implement input and input functions of the mobile phone. However, in some embodiments, the touch panel 1131 and the display panel 1141 may be integrated to implement the input and output functions of the mobile phone.

The mobile phone may further include at least one sensor 1150, such as an optic sensor, a motion sensor, and another sensor. Specifically, the optic sensor may include an ambient light sensor and a proximity sensor. The ambient light sensor may adjust luminance of the display panel 1141 based on brightness of ambient light. The proximity sensor may switch off the display panel 1141 and/or backlight when the mobile phone is moved to the ear. As a type of motion sensor, an acceleration sensor may detect magnitude of accelerations in various directions (usually on three axes), may detect magnitude and a direction of the gravity when static, and may be configured to identify an application of a mobile phone gesture (such as switchover between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may further be configured in the mobile phone. Details are not described herein.

The audio frequency circuit 1160, a loudspeaker 1161, and a microphone 1162 may provide an audio interface between the user and the mobile phone. The audio frequency circuit 1160 may convert received audio data into an electric signal and transmit the electric signal to the loudspeaker 1161. The loudspeaker 1161 converts the electrical signal into a sound signal for output. On the other hand, the microphone 1162 converts a collected sound signal into an electrical signal. The audio frequency circuit 1160 the electric signal and converts the electric signal into audio data, and outputs the audio data to the processor 1180 for processing. Then the processor 1180 sends the audio data to, for example, another mobile phone by using the RF circuit 1110, or outputs the audio data to the memory 1120 for further processing.

Wi-Fi belongs to a short distance radio transmission technology. The mobile phone may help, by using a Wi-Fi module 1170, the user send and receive emails, browse a web page, access streaming media, and so on, which provides wireless broadband Internet access for the user. Although FIG. 10 shows the Wi-Fi module 1170, it may be understood that the Wi-Fi module is not a necessary component of the mobile phone, and when required, the Wi-Fi module may be omitted as long as the scope of the essence of the present invention is not changed.

The processor 1180 is a control center of the mobile phone, and is connected to various parts of the entire mobile phone by using various interfaces and lines. By running or executing the software program and/or module stored in the memory 1120, and invoking data stored in the memory 1120, the processor 1180 performs various functions of the mobile phone and data processing, thereby performing overall monitoring on the mobile phone. Optionally, the processor 1180 may include one or more processing units. Preferably, the processor 1180 may integrate an application processor and a modem processor. The application processor mainly processes an operating system, a user interface, an application program, and the like. The modem processor mainly processes wireless communication. It may be understood that the modem processor may alternatively not be integrated into the processor 1180.

The mobile phone further includes the power supply 1190 (for example, a battery) for supplying power to the components. Preferably, the power supply may be logically connected to the processor 1180 by using a power management system, to implement functions such as charging, discharging, and power consumption management by using the power management system.

Although not shown, the mobile phone may further include a camera, a Bluetooth module, and the like. Details are not described herein.

In this embodiment of this application, the processor 1180 included in the terminal further has the following functions:

separately establishing communication connections to a first frequency band network of a router and a second frequency band network of the router;

transmitting data by using the first frequency band network and the second frequency band network, where the data includes uplink data and downlink data;

determining, based on a transmission status of the first frequency band network and a transmission status of the second frequency band network, to obtain the downlink data by using the second frequency band network and transmit the uplink data by using the first frequency band network; and transmitting the downlink data by using the second frequency band network and transmitting the uplink data by using the first frequency band network.

In a possible implementation, the processor 1180 is specifically configured to:

determine, based on a service load amount of the first frequency band network and a service load amount of the second frequency band network, to transmit the downlink data by using the second frequency band network and transmit the uplink data by using the first frequency band network.

In another possible implementation, the downlink data includes data of a data service; and the uplink data includes uplink control data. The transmission status of the first frequency band network and the transmission status of the second frequency band network include: a service load amount of the first frequency band network is greater than a first preset threshold. The processor 1180 is specifically configured to:

determine to transmit the data of the data service by using the second frequency band network; and determine to transmit the uplink control data by using the first frequency band network.

In another possible implementation, the downlink data includes data of a data service, and the uplink data includes uplink control data. The transmission status of the first frequency band network and the transmission status of the second frequency band network include: a service load amount of the first frequency band network is greater than a first preset threshold, and a service load amount of the second frequency band network is greater than a second preset threshold. The processor 1180 is specifically configured to:

determine to transmit the data of the data service by using the second frequency band network; and determine to transmit the uplink control data by using the first frequency band network.

In another possible implementation, the processor 1180 is specifically configured to:

transmit the data of the data service by using the second frequency band network; and preferentially transmit the uplink control data by using the first frequency band network.

In another possible implementation, the processor 1180 is specifically configured to:

mark a label on a packet corresponding to the uplink control data; and preferentially transmit the uplink control data based on the label by using the first frequency band network.

In another possible implementation, the processor 1180 is specifically configured to:

set a quantity of uplink control users into a high-priority queue of the first frequency band network; and preferentially transmit the uplink control data in the high-priority queue by using the first frequency band network.

In another possible implementation, the processor 1180 is further configured to:

determine data corresponding to a data service in the downlink data.

In another possible implementation, the processor 1180 is specifically configured to:

determine, based on a port number of a packet of the downlink data, the data corresponding to the data service in the downlink data; or determine, based on a data frame in a packet of the downlink data, the data corresponding to the data service in the downlink data.

In another possible implementation, the first frequency band network is a 2.4 GHz frequency band network; and the second frequency band network is a 5 GHz frequency band network.

In this embodiment of this application, the processor in the terminal shown in FIG. 10 may further implement the following content:

separately establishing communication connections to a first frequency band network of a router and a second frequency band network of the router; transmitting data by using the first frequency band network and the second frequency band network, where the data includes uplink data and downlink data; determining, based on a signal strength of the first frequency band network and a signal strength of the second frequency band network, to correspondingly transmit the uplink data and the downlink data by using the second frequency band network and the first frequency band network; and correspondingly transmitting the uplink data and the downlink data by using the second frequency band network and the first frequency band network.

In a possible implementation, the uplink data includes uplink control data. The signal strength of the first frequency band network and the signal strength of the second frequency band network include: the signal strength of the second frequency band network is less than a third preset threshold. The processor 1180 is specifically configured to:

determine to transmit the downlink data by using the first frequency band network, and determine to transmit the uplink control data by using the second frequency band network.

In another possible implementation, the uplink data includes uplink control data. The signal strength of the first frequency band network and the signal strength of the second frequency band network include: the signal strength of the first frequency band network is greater than a fourth preset threshold, and the signal strength of the second frequency band network is greater than a third preset threshold. The processor 1180 is specifically configured to:

determine to transmit the downlink data by using the second frequency band network, and determine to transmit the uplink control data by using the first frequency band network.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In another possible design, when the terminal is a chip, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the terminal performs the data processing method according to any one of the first aspect or the second aspect. Optionally, the storage unit is a storage unit in the chip, for example, a register or a cache. The storage unit may alternatively be a storage unit that is in the terminal and that is outside the chip, for example, a read-only memory (ROM), another type of static storage device capable of storing static information and an instruction, or a random access memory (RAM).

Any one of the processors mentioned above may be a general-purpose central processing unit (CPU), a microprocessor, an application-specific integrated circuit (ASIC), or one or more integrated circuits configured to control execution of a program of the data processing method according to the first aspect or the second aspect.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

In the several embodiments provided in this application, it should be understood that the disclosed system, apparatus, and method may be implemented in another manner. For example, the described apparatus embodiment is merely an example. For example, the unit division is merely logical function division or may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended to describe the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of this application.

What is claimed is:

1. A data processing method, implemented by a first device, comprising:
    establishing a first communication connection with a first frequency band network of a second device;
    establishing a second communication connection with a second frequency band network of the second device;
    transmitting uplink data and downlink data by using the first communication connection and the second communication connection;
    determining that a transmission status of the first frequency band network and a transmission status of the second frequency band network meet a first condition;
    transmitting, in response to meeting the first condition, the downlink data by using the second communication connection, and transmitting the uplink data by using the first communication connection,
    wherein the uplink data and downlink data are transmitted by using an inter-frequency channel, to reduce occurrence of a service stalling problem caused by congestion of a control packet in the uplink data, and to improve service smoothness,
    wherein the downlink data comprises data of a data service, and the uplink data comprises uplink control data,
    wherein the first device determines the data of the data service by using a port number of the data carried in a packet header in a packet of the downlink data, or the first device determines the data of the data service based on a data frame of a packet of the downlink data, and
    wherein the first device determines the uplink control data in the uplink data by using a packet transmission protocol of the uplink data.

2. The method according to claim 1, wherein the determining that the transmission status of the first frequency band network and the transmission status of the second frequency band network meet the first condition comprises:
  determining that a service load amount of the first communication connection is greater than a first preset threshold.

3. The method according to claim 1, wherein the determining that the transmission status of the first frequency band network and the transmission status of the second frequency band network meet the first condition comprises:
  determining that a service load amount of the first communication connection is greater than a first preset threshold, and a service load amount of the second communication connection is greater than a second preset threshold.

4. The method according to claim 1, wherein the transmitting the uplink data by using the first communication connection comprises:
  setting the uplink control data in a high-priority queue corresponding to the first communication connection; and
  transmitting the uplink control data in the high-priority queue by using the first communication connection.

5. The method according to claim 1, further comprising:
  determining, based on a data frame in a packet of the downlink data, data corresponding to the data service in the downlink data.

6. The method according to claim 1, wherein the first communication connection is a 2.4 GHz frequency band communication connection, and the second communication connection is a 5 GHz frequency band communication connection.

7. A first device, comprising:
  at least one processor; and
  a memory coupled to the at least one processor and configured to store programming instructions that are executed by the at least one processor to cause the first device to:
  establish a first communication connection with a first frequency band network of a second device;
  establish a second communication connection with a second frequency band network of the second device;
  transmit uplink data and downlink data by using the first communication connection and the second communication connection;
  determine that a transmission status of the first frequency band network and a transmission status of the second frequency band network meet a first condition;
  transmit, in response to meeting the first condition, the downlink data by using the second communication connection, and transmitting the uplink data by using the first communication connection,
  wherein the uplink data and downlink data are transmitted by using an inter-frequency channel, to reduce occurrence of a service stalling problem caused by congestion of a control packet in the uplink data, and to improve service smoothness,
  wherein the downlink data comprises data of a data service, and the uplink data comprises uplink control data,
  wherein the first device determines the data of the data service by using a port number of the data carried in a packet header in a packet of the downlink data, or the first device determines the data of the data service based on a data frame of a packet of the downlink data, and
  wherein the first device determines the uplink control data in the uplink data by using a packet transmission protocol of the uplink data.

8. The first device according to claim 7, wherein the determining that the transmission status of the first frequency band network and the transmission status of the second frequency band network meet the first condition comprises:
  determining that a service load amount of the first communication connection is greater than a first preset threshold.

9. The first device according to claim 7, wherein the determining that the transmission status of the first frequency band network and the transmission status of the second frequency band network meet the first condition comprises:
  determining that a service load amount of the first communication connection is greater than a first preset threshold, and a service load amount of the second communication connection is greater than a second preset threshold.

10. The first device according to claim 7, wherein the transmitting the uplink data by using the first communication connection comprises:
  setting the uplink control data in a high-priority queue corresponding to the first communication connection; and
  transmitting the uplink control data in the high-priority queue by using the first communication connection.

11. The first device according to claim 7, wherein the memory is further configured to store programming instructions that are executed by the at least one processor to cause the first device to:
  determine, based on a data frame in a packet of the downlink data, data corresponding to the data service in the downlink data.

12. The first device according to claim 7, wherein the first communication connection is a 2.4 GHz frequency band communication connection, and the second communication connection is a 5 GHz frequency band communication connection.

13. A computer program product comprising computer-executable instructions that are stored on a non-transitory computer-readable medium and that are executed by a processor to cause a first device to:
  establish a first communication connection with a first frequency band network of a second device;
  establish a second communication connection with a second frequency band network of the second device;
  transmit uplink data and downlink data by using the first communication connection and the second communication connection;
  determine that a transmission status of the first frequency band network and a transmission status of the second frequency band network meet a first condition;
  transmit, in response to meeting the first condition, the downlink data by using the second communication connection, and transmitting the uplink data by using the first communication connection,
  wherein the uplink data and downlink data are transmitted by using an inter-frequency channel, to reduce occurrence of a service stalling problem caused by congestion of a control packet in the uplink data, and to improve service smoothness,
  wherein the downlink data comprises data of a data service, and the uplink data comprises uplink control data, wherein the first device determines the data of the data service by using a port number of the data carried in a packet header in a packet of the downlink data, or the first device determines the data of the data service based on a data frame of a packet of the downlink data, and wherein the first device determines the uplink control data in the uplink data by using a packet transmission protocol of the uplink data.

14. The computer program product according to claim 13, wherein the determining that the transmission status of the first frequency band network and the transmission status of the second frequency band network meet the first condition comprises:

determining that a service load amount of the first communication connection is greater than a first preset threshold.

15. The computer program product according to claim 13, wherein the determining that the transmission status of the first frequency band network and the transmission status of the second frequency band network meet the first condition comprises:

determining that a service load amount of the first communication connection is greater than a first preset threshold, and a service load amount of the second communication connection is greater than a second preset threshold.

16. The computer program product according to claim 13, wherein the transmitting the uplink data by using the first communication connection comprises:

setting the uplink control data in a high-priority queue corresponding to the first communication connection; and transmitting the uplink control data in the high-priority queue by using the first communication connection.

17. The computer program product according to claim 13, wherein the computer-executable instructions are executed to cause the first device to:

determine, based on a data frame in a packet of the downlink data, data corresponding to the data service in the downlink data.

* * * * *